Aug. 2, 1938.    P. H. CHASE    2,125,668
SIGNAL
Filed Oct. 14, 1935    13 Sheets-Sheet 1
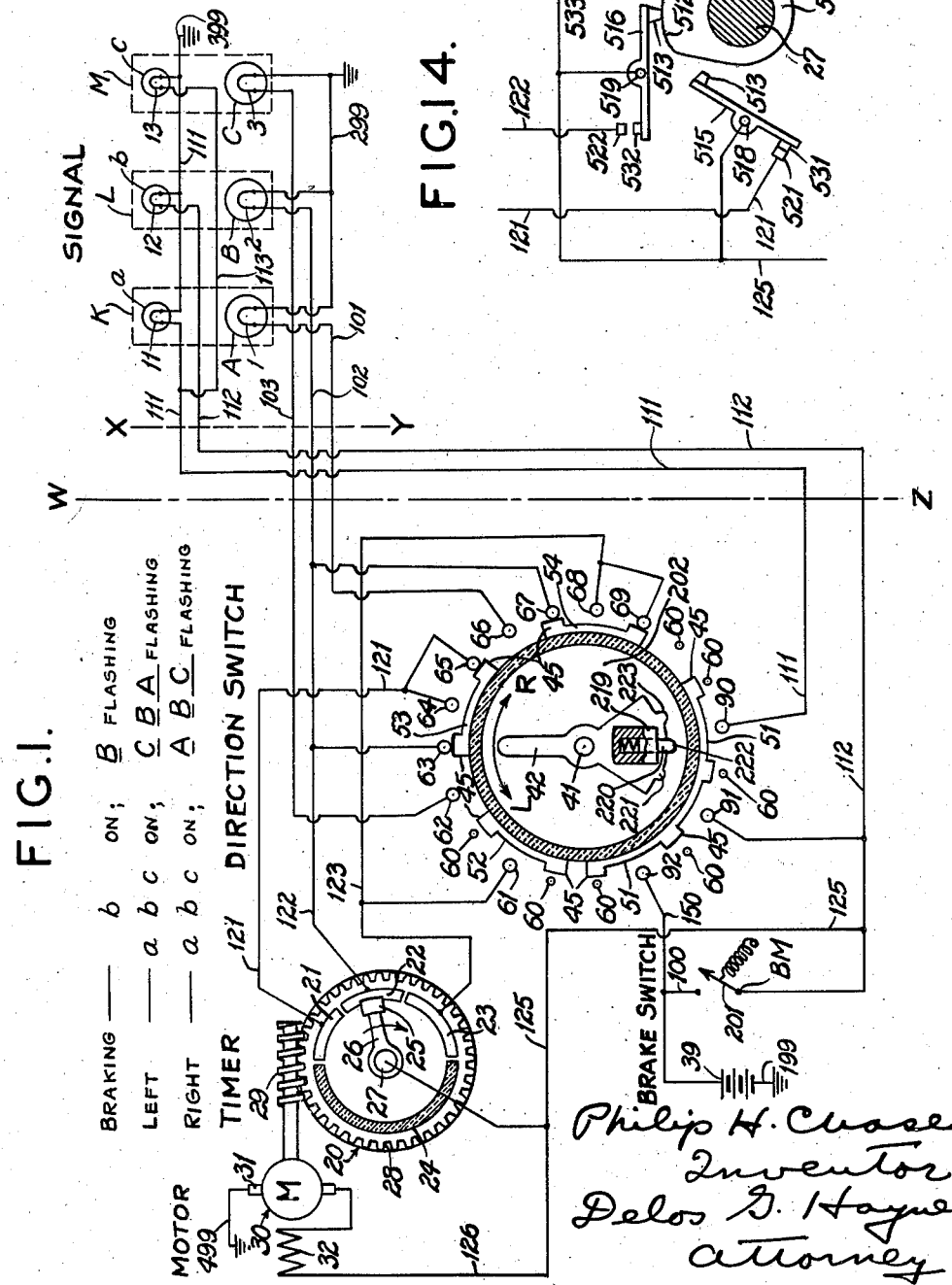

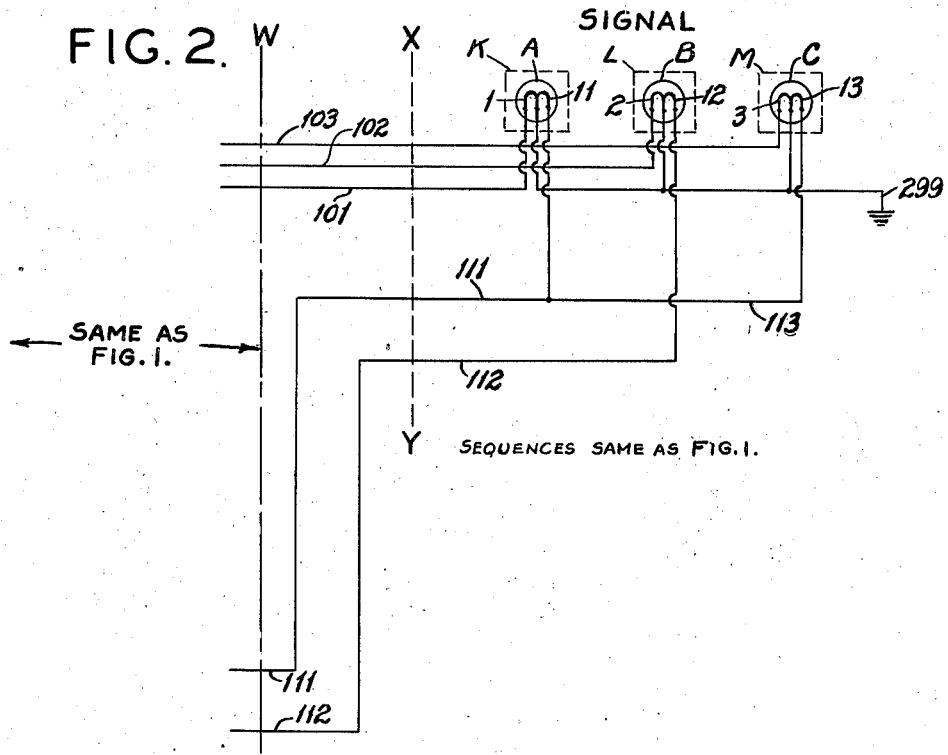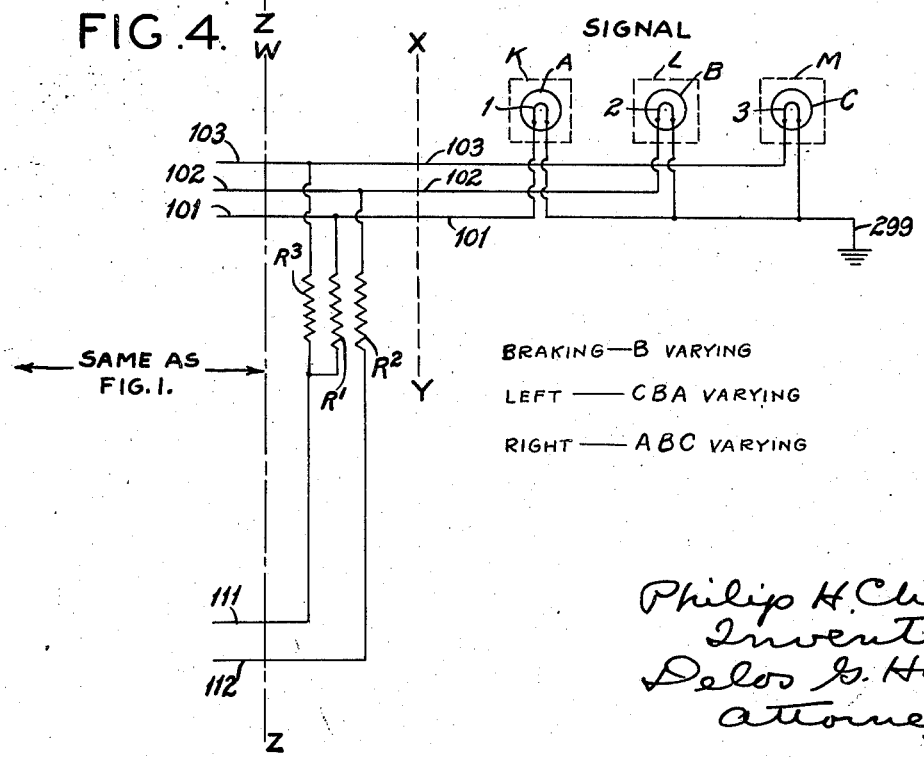

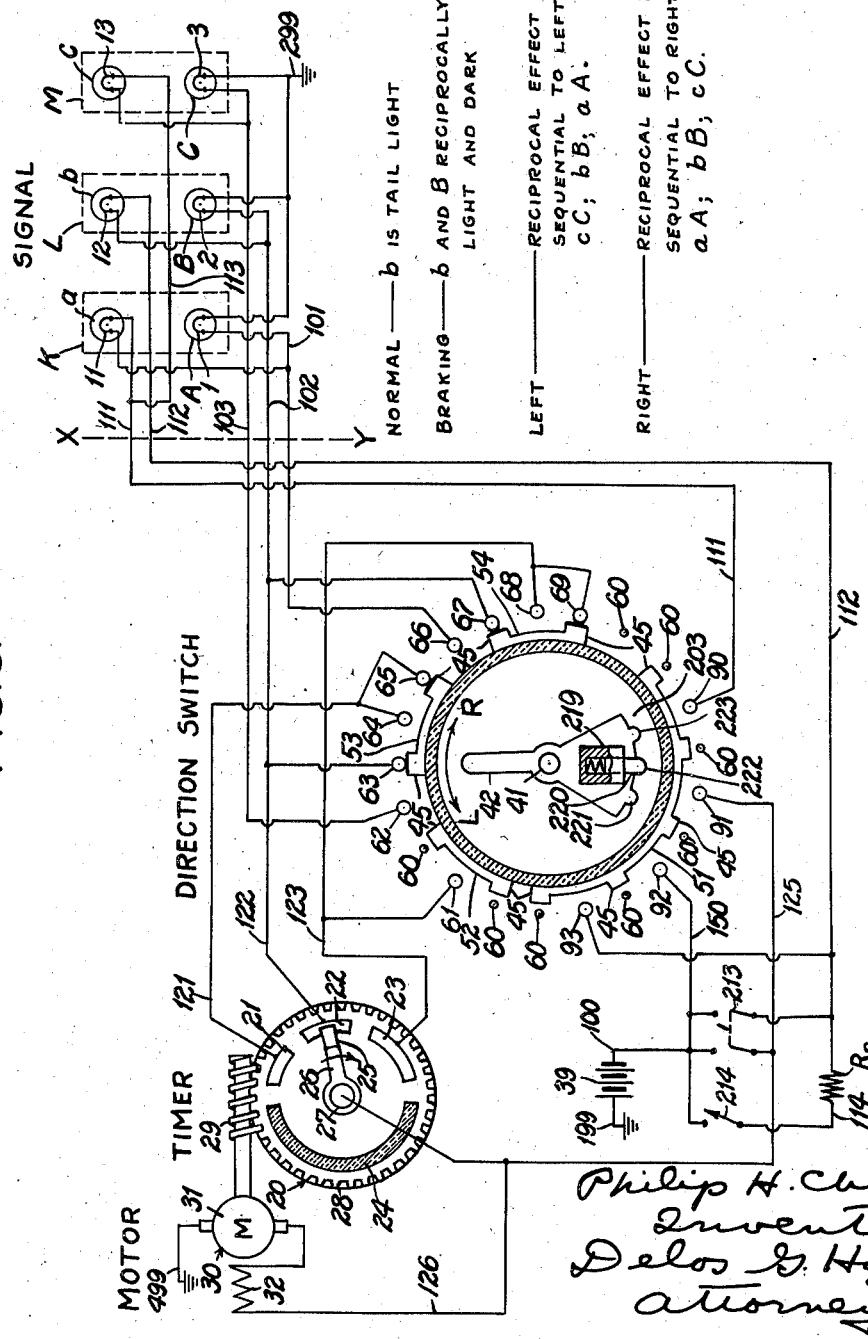

Aug. 2, 1938.  P. H. CHASE  2,125,668
SIGNAL
Filed Oct. 14, 1935 13 Sheets-Sheet 4
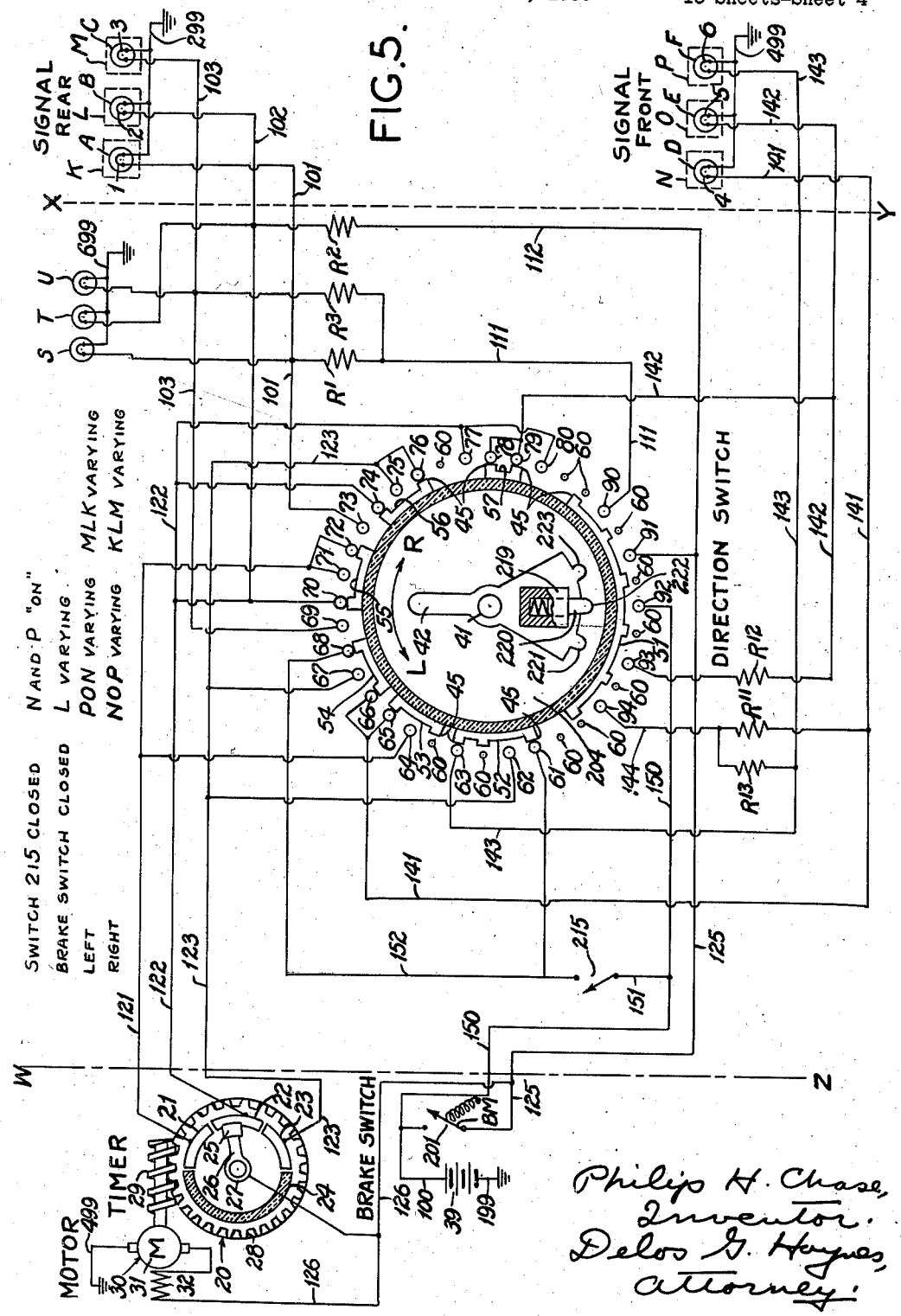

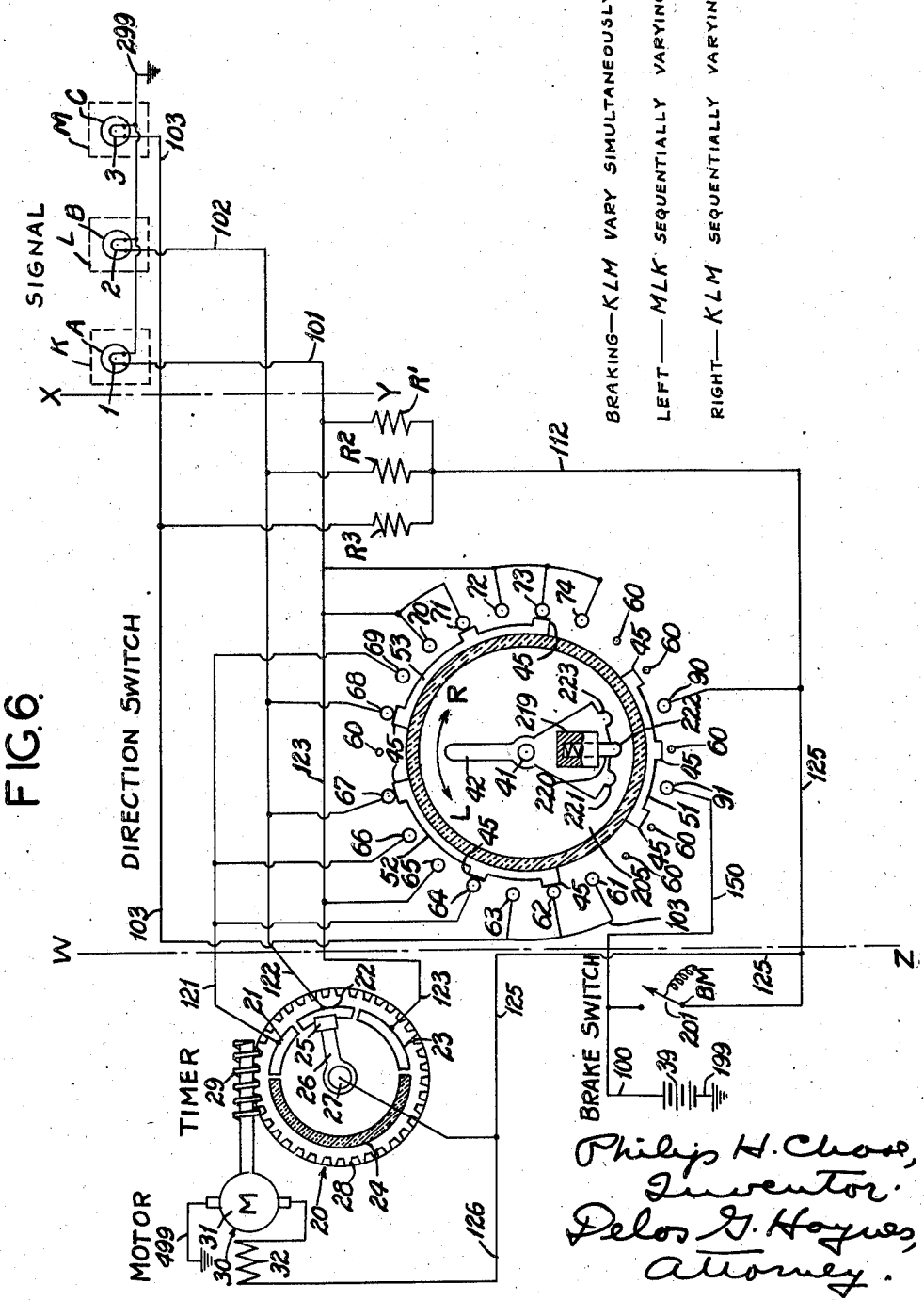

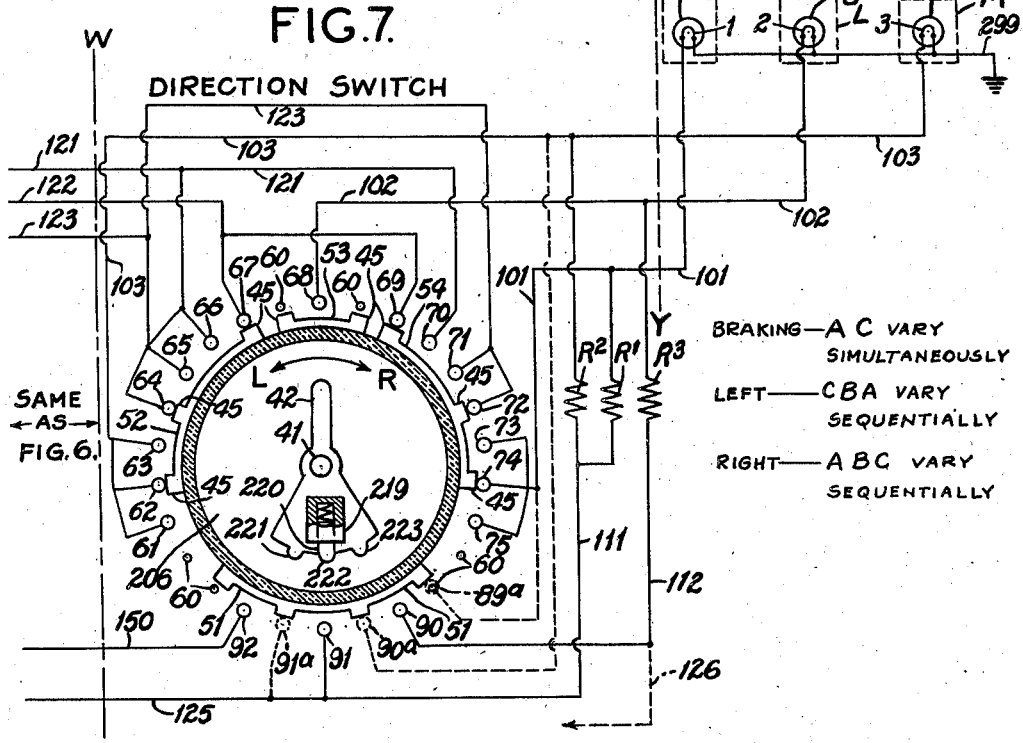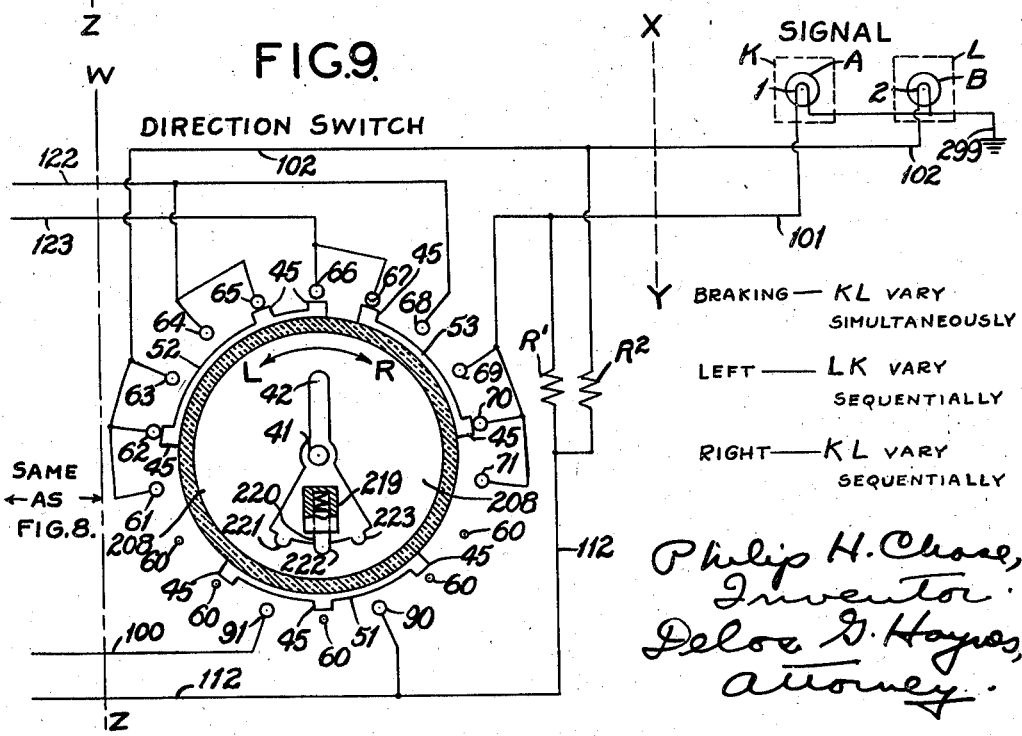

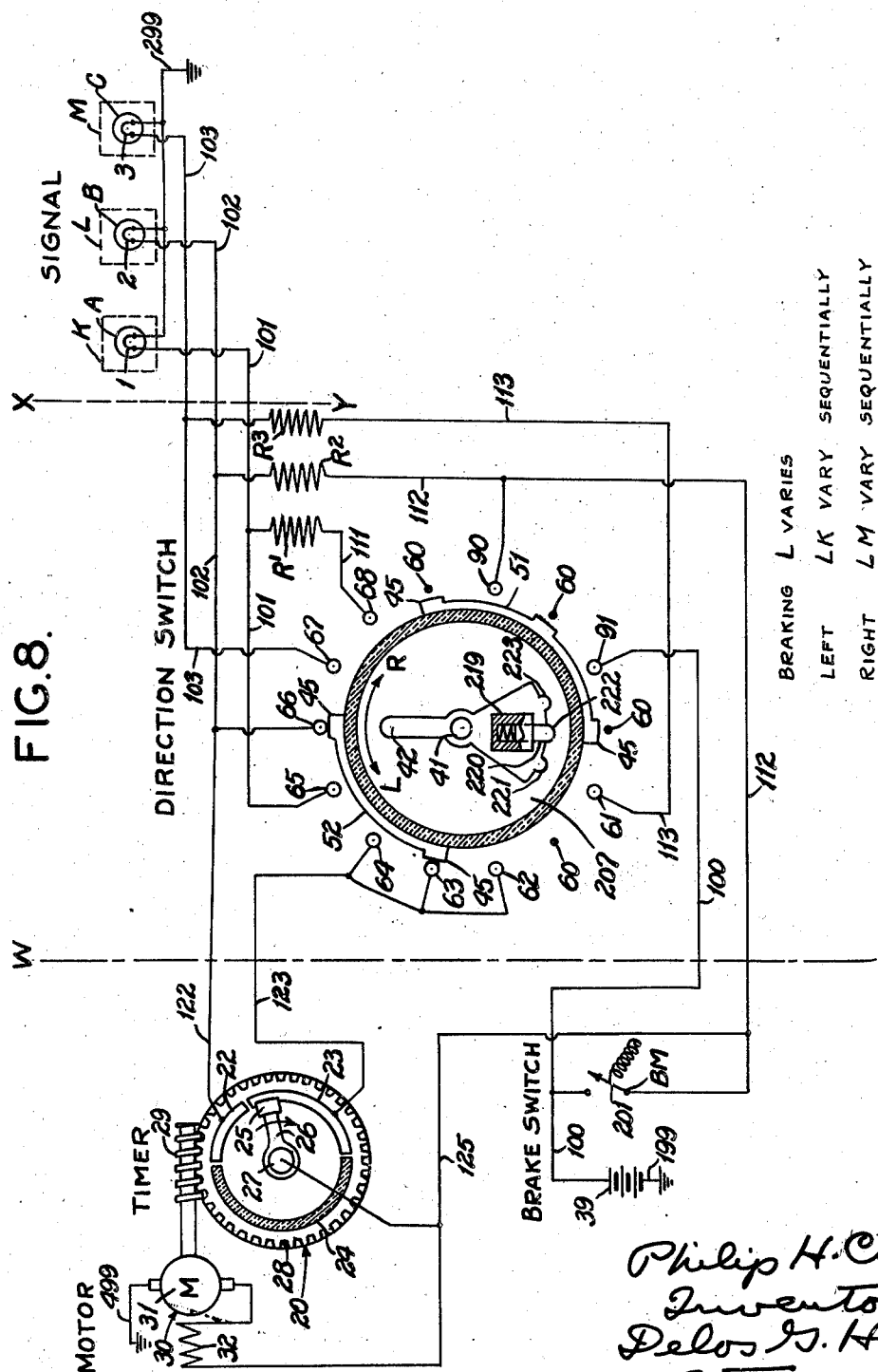

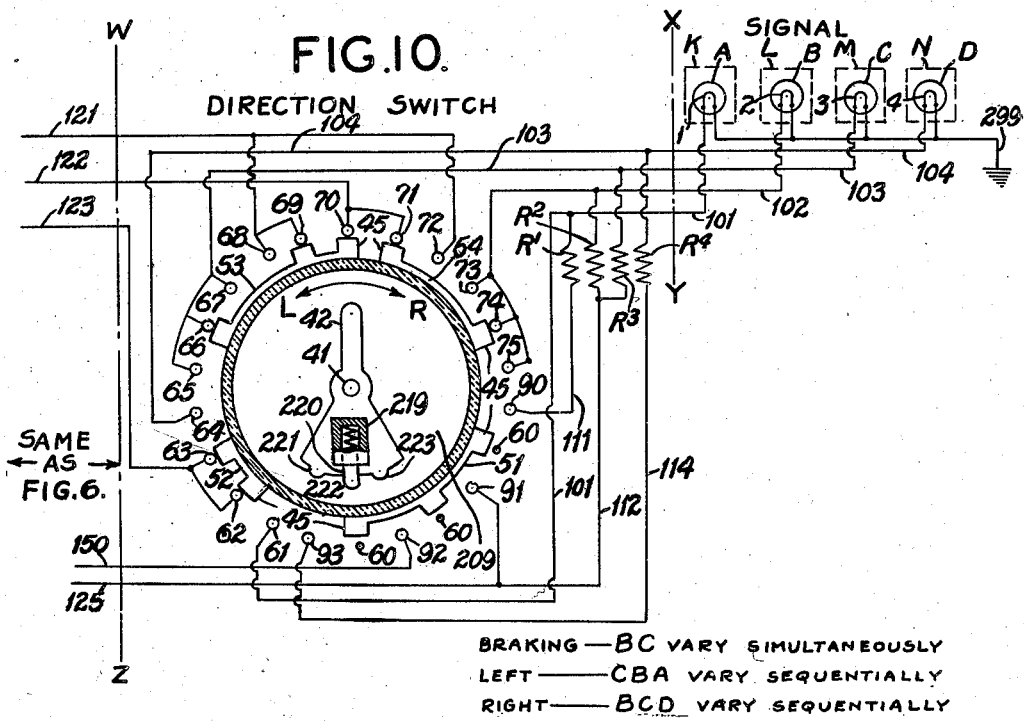
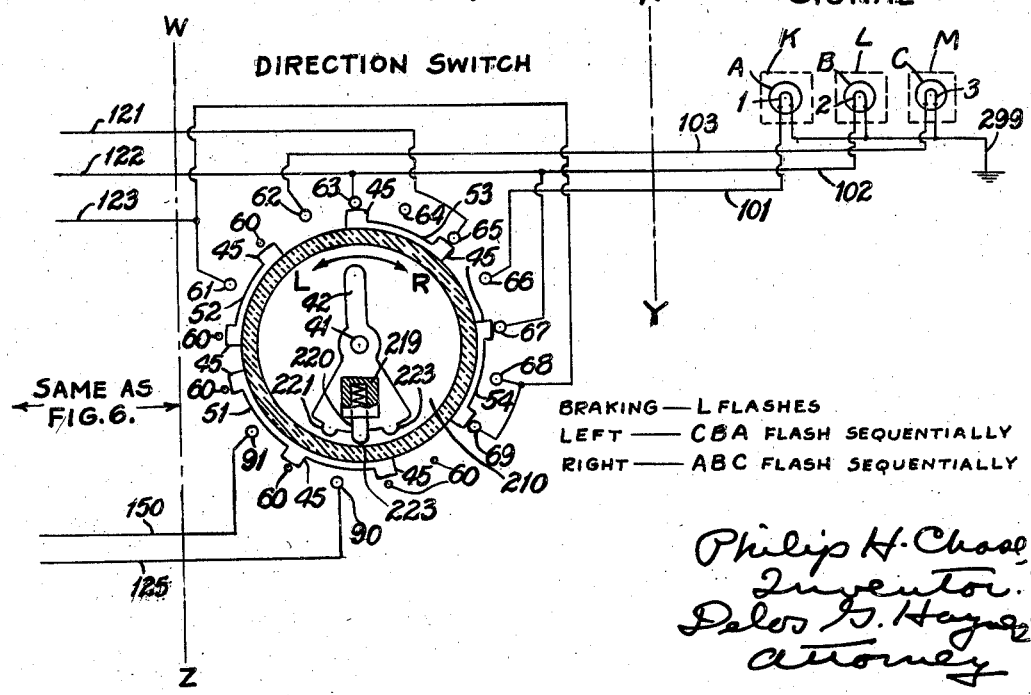

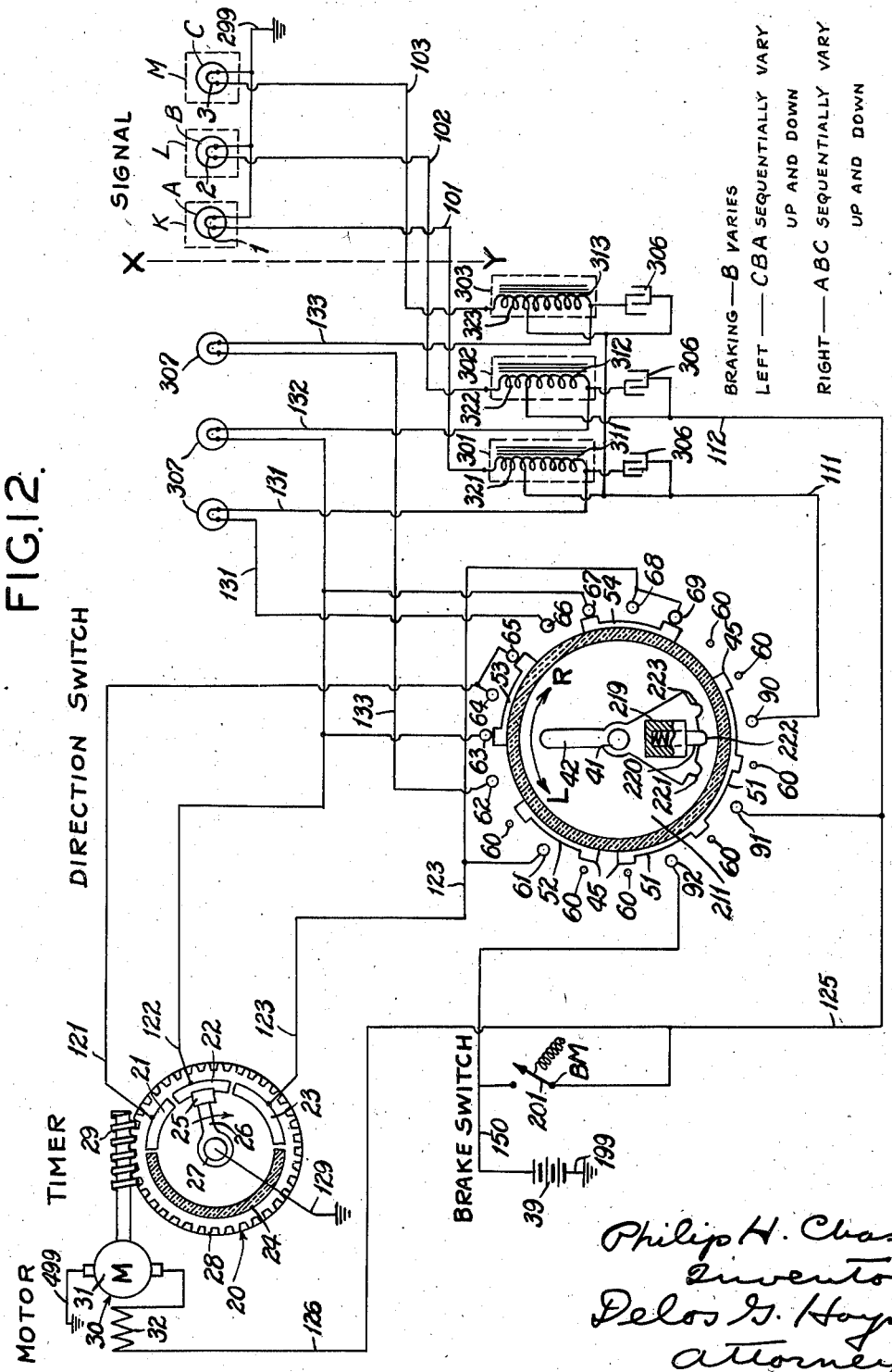

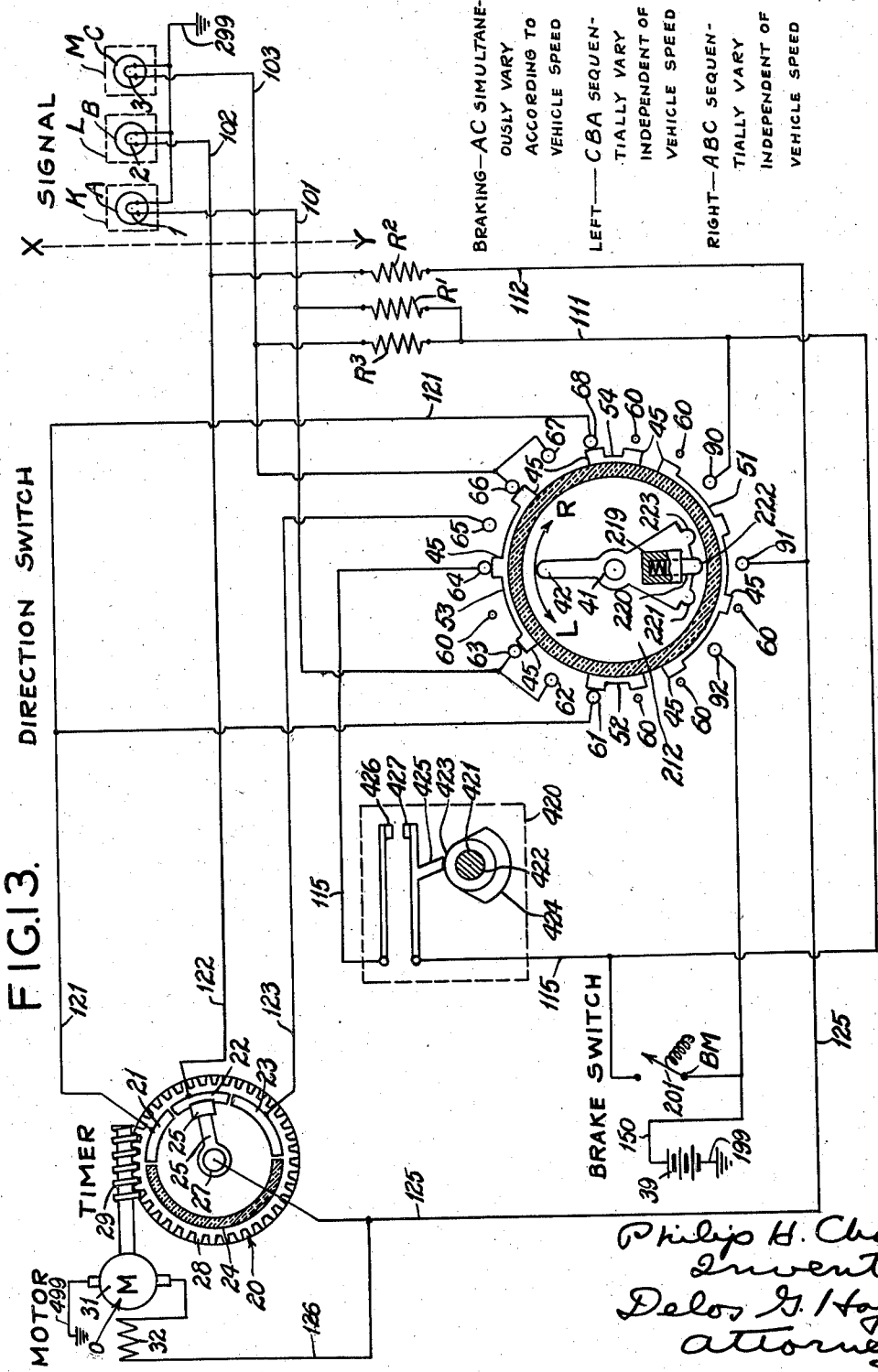

Aug. 2, 1938.　　　P. H. CHASE　　　2,125,668
SIGNAL
Filed Oct. 14, 1935　　　13 Sheets-Sheet 11

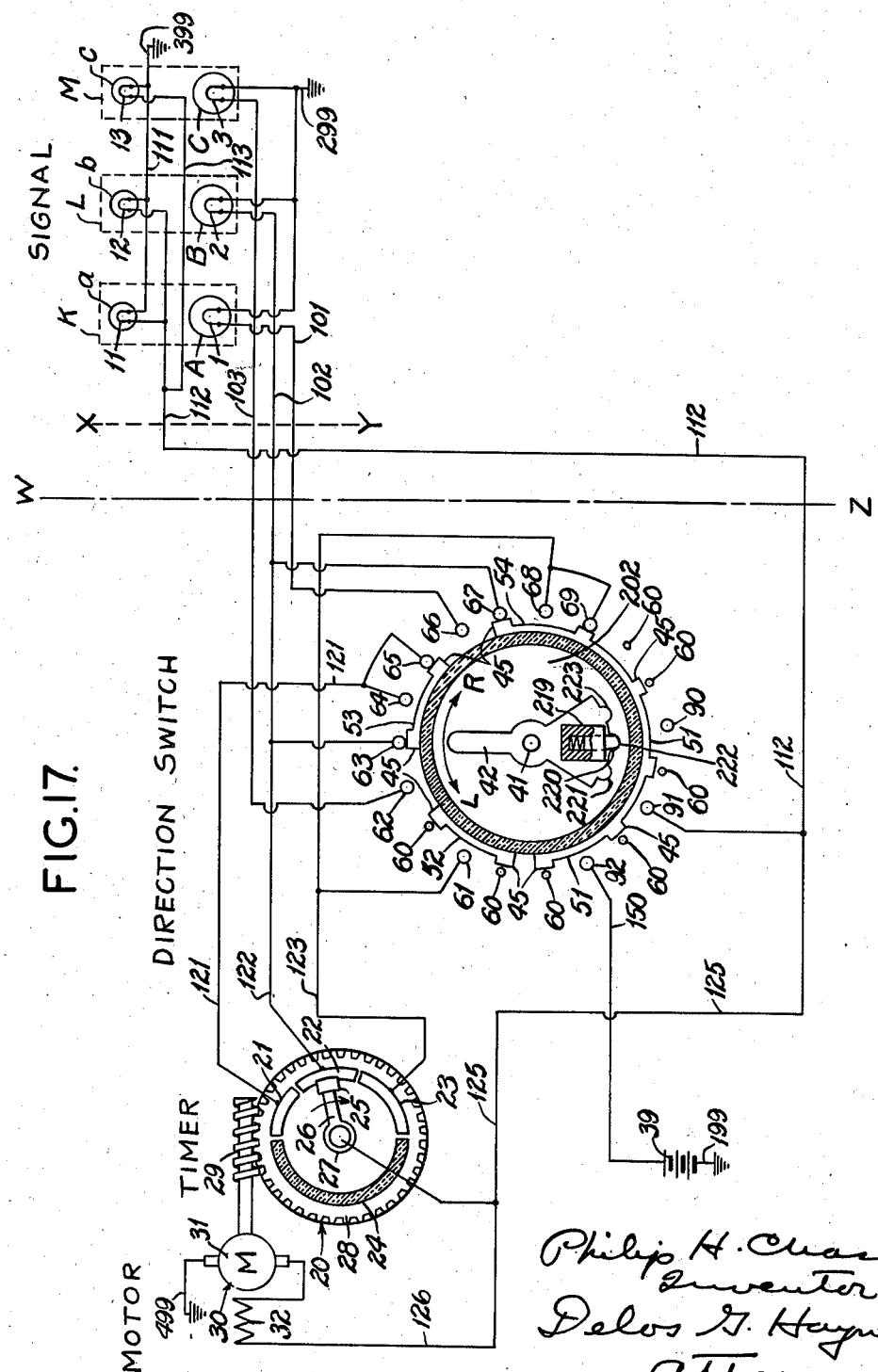

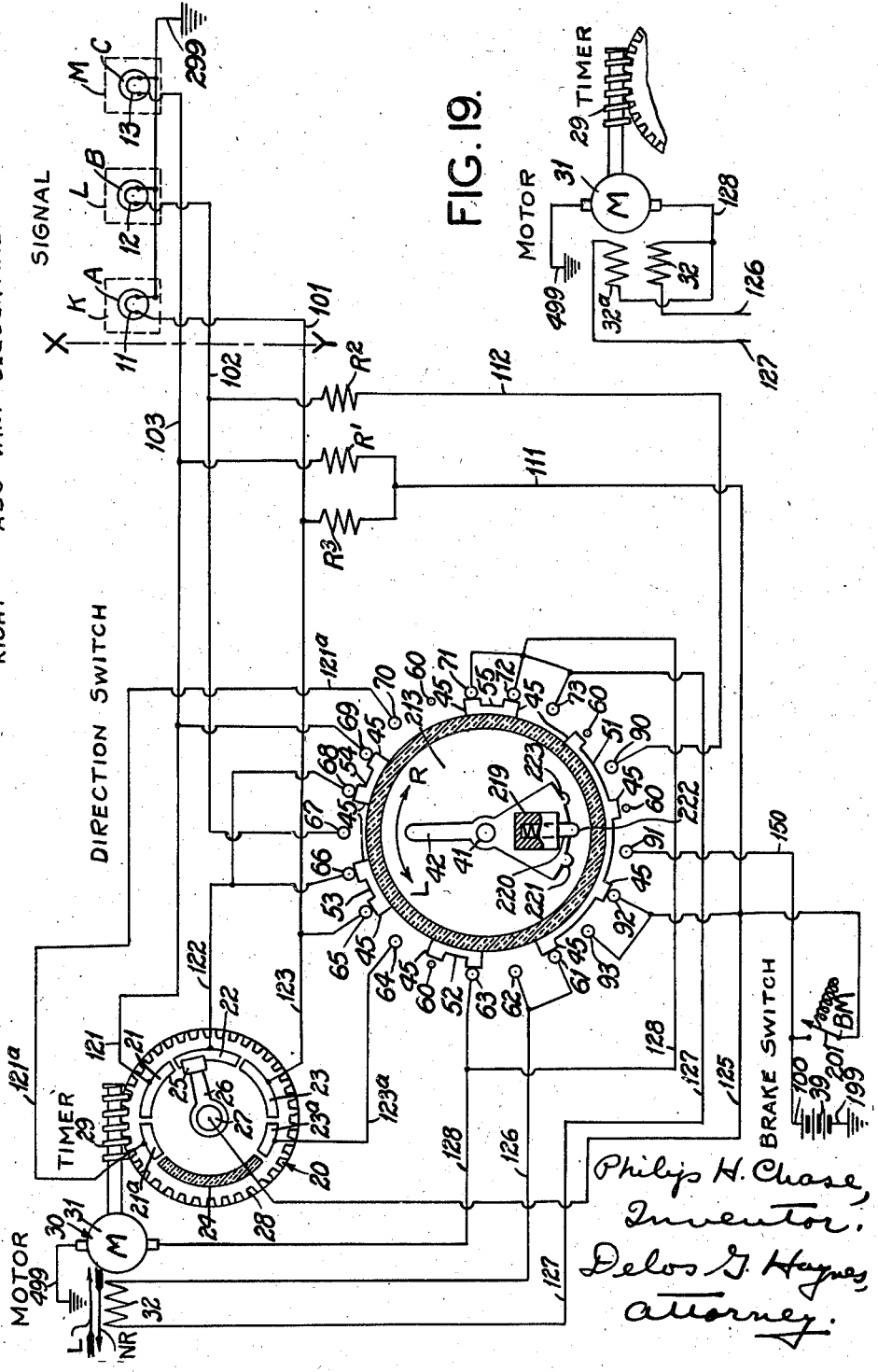

Patented Aug. 2, 1938

2,125,668

UNITED STATES PATENT OFFICE 2,125,668

SIGNAL

Philip H. Chase, Bala-Cynwyd, Pa.

Application October 14, 1935, Serial No. 44,941

19 Claims. (Cl. 177—337)

This invention relates to an electric light signal system and with regard to certain more specific features to a signal system for motor vehicles.

Among the objects of the invention may be noted the provision of a signal which indicates the direction of turn by traversing light effects; the provision of a combined stop light and direction signal; the provision of different light-variations to make more distinctive the various signals; the provision of signal lights for combined tail light, stop signal and direction signal purposes; the provision of dual-purpose facilities for illumination and signalling; and the provision of clear differentiation between types of signals. Other objects will be in part obvious and in part pointed out hereinafter.

The invention accordingly comprises the elements and combinations of elements, features of construction and arrangements of parts which will be exemplified in the structures and circuits hereinafter described, and the scope of the application of which will be indicated in the following claims.

In the accompanying drawings, in which are illustrated several of various possible embodiments of the invention, Fig. 1 is a diagrammatic layout illustrating a signalling system wherein variations of signal are obtained from compound signal elements;

Fig. 2 is a fragmentary layout showing a variation of Fig. 1 wherein the line WZ matches the corresponding line WZ in Fig. 1;

Fig. 3 is a view similar to Fig. 1 showing a modification;

Fig. 4 is a view similar to Fig. 2 showing another variation of the Fig. 1 form;

Fig. 5 is a diagrammatic layout showing another form of the invention wherein front and rear signals are employed;

Fig. 6 is a diagrammatic layout showing another form of the invention wherein unitary signal elements are used;

Fig. 7 is a fragmentary layout constituting a variation of the form of the invention shown in Fig. 6, wherein the match line WZ matches the corresponding line WZ in said Fig. 6;

Fig. 8 is another modification of the system of Fig. 6;

Fig. 9 is a fragmentary view showing a variation of the form of the invention shown in Fig. 8 wherein the match line WZ matches the corresponding line WZ in said Fig. 8;

Fig. 10 is a fragmentary layout showing a variation of the modification shown in Fig. 6 wherein the line WZ matches the corresponding line WZ in said Fig. 6;

Fig. 11 is a view similar to Fig. 10 showing a variation of the form of the invention shown in Fig. 6, wherein the match line WZ corresponds to the match line WZ in Fig. 6;

Fig. 12 is a complete diagrammatic layout showing another form of the invention wherein impulse transformers are used;

Fig. 13 is a complete diagrammatic layout showing another form of the invention wherein differentiations in signal light variation frequencies are obtained for different functions;

Fig. 14 is a fragmentary detail showing an alternate form of distributor (adjacent Fig. 1);

Figures 15, 16:
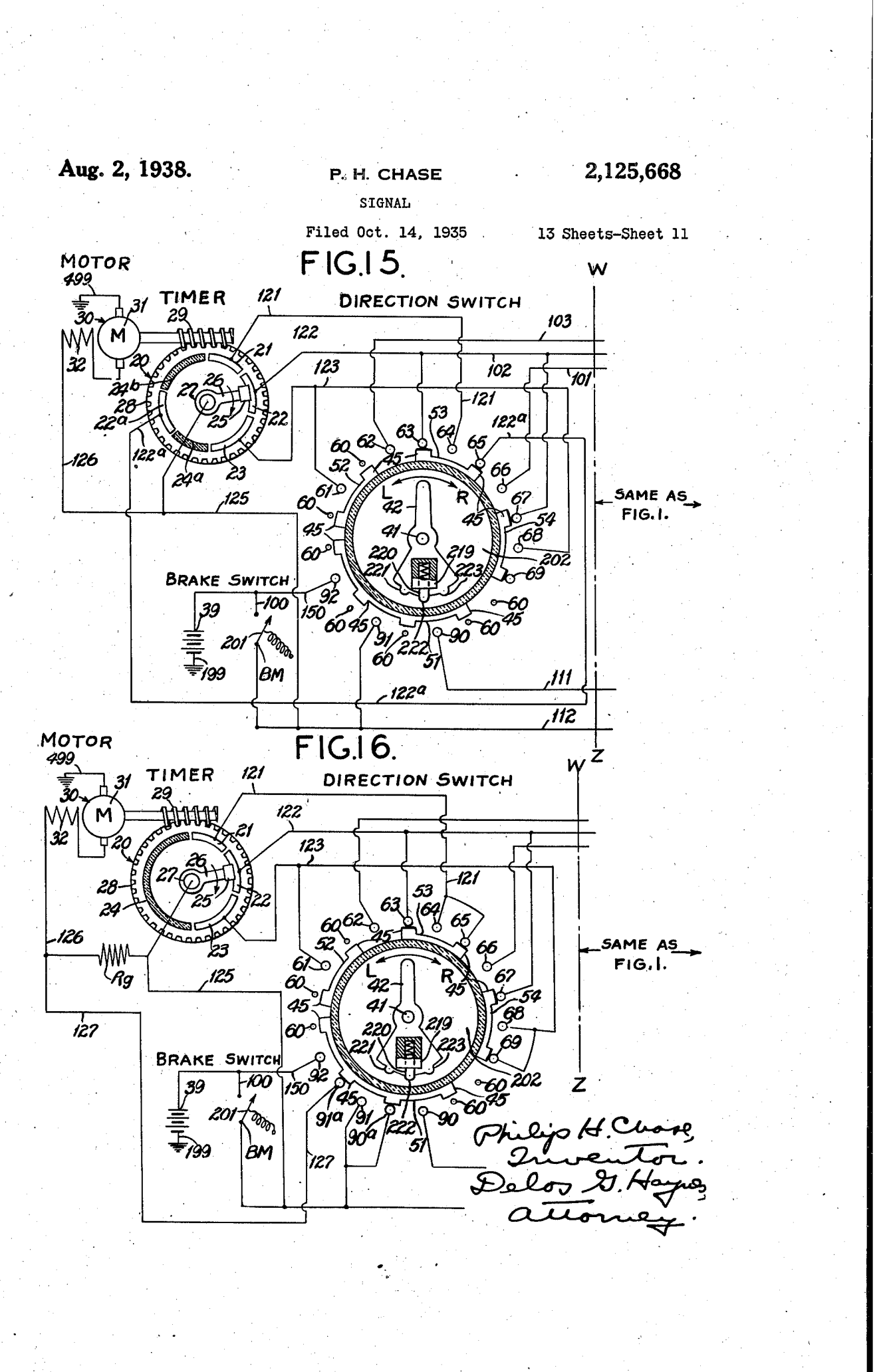

Fig. 15 is a fragmentary layout showing a variation of the form of the invention shown in Fig. 1 wherein the match line WZ matches the corresponding line WZ in said Fig. 1;

Fig. 16 is a view similar to Fig. 15 showing another modification;

Fig. 17 is a layout showing another modification of Fig. 1;

Fig. 18 is a layout showing another modification wherein a reversing timer is used; and, Fig. 19 is a fragmentary view showing a modification of certain motor parts of Fig. 18.

Similar reference characters indicate corresponding parts throughout the several views of the drawings.

On motor vehicles, the practice of signalling "left" and "right" turns by hand is little observed and when done, often escapes notice, or is not understood. Such hand signals are usually inconvenient to the driver of a closed vehicle, particularly during inclement weather. Electric direction signals of the usual types are subject to difficulties which are similar to those relating to the "stop" light.

The installation and operation of direction signals is frequently insufficiently correlated with the stop light in respect to construction details, reliability of operation and distinctiveness. Unless signals are sufficiently distinctive, they may not attract and hold the attention of the operators of other vehicles, pedestrians and others concerned. Particularly important is the need for the signal clearly to indicate without confusion the intention of the vehicle operator in respect to slowing down, and stopping and making turns.

Dependence upon signal shape, signal color and combinations thereof, have certain disadvantages, and when depended upon alone generally lack attracting power and differentiation.

Flashing of signals generally increases their attention commanding power, but without sufficient correlation of the flashing of the different types of signal there may be lack of clear differentiation therebetween.

The present invention secures the advantages of light sections or compartments relatively few in number and of moderate size which produce signals of great effectiveness, including obvious purport, high attention-commanding power, and clear differentiation between stop, left turn and right turn.

Referring now more particularly to Figure 1, there is illustrated an embodiment of the invention in which are three light compartments, or sections, K, L and M, and in each section respectively are pairs of lamps A and a, B and b, and C and c. The filaments 1, 2 and 3 respectively of lamps A, B and C are energized respectively by wires 101, 102 and 103; and the filaments 11, 12 and 13 respectively of lamps a, b and c are energized respectively by wires 111, 112 and 113, wire 113 being connected to wire 111. The other terminals of the filaments are connected to the common return, usually the frame in the case of a motor vehicle, by wires 299 and 399.

The lamps a, b and c are preferably of smaller candle-power than lamps A, B and C respectively. I have secured satisfactory results with lamps a, b and c, each of 3 candle-power, and lamps A, B and C of 15 candle-power, all of the usual automobile type. However, depending upon conditions, such as the character and amount of light reflecting surface in each of the compartments and the nature of the signal desired, the sizes of the lamps may be widely varied from the above values. The pairs of lamps in each section, A and a, B and b and C and c respectively, preferably are located in close proximity to each other, so that their respective lights combine, coalesce or blend. In a compartment the color of the two lights may be the same, or different, and also in the different compartments the color of the lights may be the same, or different, depending upon signal results desired. The rear aspect of each light section may be equipped with lenses of glass or other suitable light-transmitting material, through which the light from the signal lamps passes and is colored, directed and/or diffused or otherwise coalesced as required.

The light sections K, L and M are mounted horizontally in line on the rear of the vehicle with their open faces or aspects all facing rearwardly of the vehicle, in order to afford the desired signal to the rear, for example, to inform the drivers of following vehicles. The light sections K, L and M may be located immediately adjacent to each other, or as much as 2 to 4 feet apart, depending, for example, upon the type of vehicle, the arrangement of the rear and the size and other characteristics of the sections. I have secured satisfactory results with the light sections immediately adjacent to each other, each section approximately 2½ inches high and 4 inches wide. Satisfactory results have also been secured with light sections approximately 12 inches apart and 36 inches apart, the latter spacing such as with K and M in line with the two rear mudguards of the vehicle and L midway between.

The signal lamps A, B and C and a, b and c are energized from the battery 39, one terminal of which is connected to the common return by wire 199 and the other, or live terminal, is connected by wire 100 to switch 201 and wire 150 to contact 92 of switch 202. Switch 201, the usual stop light or brake switch actuated by a brake mechanism shaft BM, is normally open and is closed by depressing the foot brake pedal connected to said shaft BM (not shown). A direction switch 202 is manually operated by means of handle 42, which may be mounted on the dash or on the steering column, or in some other place convenient to the operator of the vehicle. It is, for example, of the switch types commonly used for motor vehicle lighting and radio applications, and is shown in Figure 1 in its middle or neutral position. From this position it is operated either to the left (counter-clockwise), or to the right (clockwise), to indicate left turn or right turn respectively. Switch 202 is held in either neutral, or left, or right position by detent mechanism 219, in which detent 220 engages in notches 221, 222 and 223 respectively for left, neutral and right positions.

The energizing of the signal system by the closing of brake switch 201, or by the left or right actuation of direction switch 202, as well as energizing the lamps described below, also energizes timer 20, driven by motor 30 through worm 29 and worm gear 28. The worm gear 28 is mounted on shaft 27 and also mounted thereon, but insulated therefrom, is brush arm 26 carrying timer brush 25 energized from wire 125. Also, insulated from arm 26, from the frame of the vehicle and from each other are timer contacts 21, 22 and 23, arranged to be contacted by timer brush 25 in the order named, as the brush rotates, illustrated in a clockwise direction. The motor driving the worm is indicated conventionally as composed of an armature and brushes 31, and series field 32. The other terminal of the motor armature is connected to common return through wire 499. I have found that a small fractional horsepower series-wound motor of the type frequently used in automobile heater fans and the like, provides quick starting and satisfactorily uniform timer speed. Under some conditions, the use of a shunt-wound motor may be preferable and other alternative means of driving the timer, such, for example, as a ratchet motor, or a speed-governed drive from the vehicle engine, or the like, may be used.

With direction switch 202 in the neutral position shown in Fig. 1, when switch 201 is closed by depressing the foot brake pedal, battery 39 energizes wires 112 and 125. Lamp b is thereupon energized through wire 112 and lights to full brilliancy, motor 30 is energized, rapidly comes to full speed and through worm 29 and worm gear 28 rotates brush arm 26. As brush arm rotates in clockwise direction, timer brush 25 successively makes contact with stationary segment contacts 21, 22 and 23 in order, to which are connected respectively wires 121, 122 and 123. The total arc occupied by timer segments 21, 22 and 23 is approximately 180° and that occupied by segment 24 (utilized in Figure 1 embodiment as a dead or spacer contact), makes up the remaining 180°. Suitable narrow gaps between the adjacent edges of said four segments provide relative insulation therebetween. Brush 25 is energized through rotating arm 26 from wire 125.

During the intervals of contact between timer brush 25 and timer-contacts 21, 22 and 23, lamp B is energized at full voltage through said contacts and wires 122 and 102, the connections to wire 102 from timer contacts 21 and 23 being afforded by the connection (in the aforesaid neutral position of switch 202), between contacts 63 and 65, and between contacts 67 and 69, respectively through segments 53 and 54 and the contact surfaces 45 thereon. Consequently, while switch 201 remains closed (and switch 202 is in neutral), lamp b burns steady and lamp B alternately is dark and illuminated at full brilliancy. As these two lamps are in the same light section L, the total light flux emanated therefrom is coalesced and varies or changes from a minimum determined by the brilliancy of lamp b to a maximum determined by the total brilliancy of lamps b and B. There is, therefore, secured a variable-brilliancy stop signal which passes through a complete cycle for every revolution of the brush arm 26. This produces a signal of unmistakable nature which is always visible and commands attention, because of its recurrently changing brightness.

When direction switch 202 is operated to the left 1/19th of a revolution, or 18.9° (to indicate left turn), by manipulation of handle 42, mounted on shaft 41, the arcuate contacts 51, 52, 53 and 54, with their contact surfaces 45, are rotated 1/19th of a turn in counter-clockwise direction. Said movable contacts 51, 52, 53 and 54 are mounted on an insulating cylinder actuated by shaft 41, and are relatively insulated from each other and from said shaft. Numeral 60 throughout indicates a dead contact or space.

Upon said left-hand switch actuation, the live terminal of battery 39 is connected through contact 92 to contacts 90 and 91 of said switch, by means of movable contact 51. Lamp b is thereupon energized through wire 112, irrespective of whether switch 201 is closed; lamps a and c are energized from contact 90 through wire 111, and light to full brightness; motor 30 and timer brush 25 are energized through wire 125 and brush 25 passes in turn over live timer contacts 21, 22 and 23 and dead contact 24. Simultaneously, upon said left-hand actuation of switch 202, timer contact 21 is connected to lamp C through wires 103 and 121 and switch contacts 64, 53 and 62; also, lamp A is connected to timer contact 23 through wires 101 and 123, and switch contacts 66, 54 and 68; timer contact 22 being connected direct to lamp B through wires 102 and 122. As brush 25 rotates, lamp C, lamp B and lamp A are energized in the order named and light to full brightness, respectively during the interval said brush makes contact with timer contacts 21, 22 and 23, by full voltage from contact 92, wire 125, brush arm 26, brush 25 and the wires as above-connected. While brush 25 passes over contact 24, an interval illustrated approximately equal to the total for passing over contacts 21, 22 and 23, all the three lamps remain dark. Conversely, when direction switch 202 is operated to the right, 1/19th of a revolution (to indicate a right turn), the arcuate contacts 51, 52, 53 and 54 are rotated 1/19th of a turn in clockwise direction. The live terminal of battery 39 is connected through contact 92 to contacts 90 and 91 by means of contact 51. Lamp b is thereupon lighted from contact 90 through wire 125 and wire 112, irrespective of whether switch 201 is closed; lamps a and c are lighted from contact 90 through wire 111; motor 30 and timer brush 25 are energized through wire 125 and brush 25 passes in turn over live timer contacts 21, 22 and 23 and dead contact 24. Simultaneously, upon said right-hand actuation of switch 202, timer-contact 21 is connected to lamp A through wires 101 and 121 and switch contacts 64, 53 and 66; also, lamp C is connected to timer-contact 23 through wires 103 and 123 and switch contacts 61, 52 and 62; timer-contact 22 being connected direct to lamp B through wires 102 and 122. As brush 25 rotates, lamp A, lamp B and lamp C are energized in the order named respectively, during the interval said brush makes contact with timer contacts 21, 22 and 23, at full voltage from contact 92, wire 125, brush arm 26, brush 25 and the wires as above-connected. While brush 25 passes over contact 24, the three lamps are dark. During this cycle, lamps a, b and c burn steady at full brilliancy. This cycle of events continues so long as the switch 202 remains in said right-hand position.

There is thus provided a stop signal distinctly different from the direction signals, and a left turn signal distinctly different from the right turn signal.

The stop signal is from a single variable-brilliancy light source (section L) periodically varying between a maximum determined by the brilliancy of lamps B and b together and a minimum determined by the brilliancy of lamp b alone.

When direction switch 202 is turned either to left or to right, a distinctly different type of signal is produced. All three light sections, K, L and M, are illuminated with a minimum brilliancy determined by lamps a, b and c respectively. A repeating uni-directional sequence of light crests is produced passing across or traversing the three sections, because during each one-half revolution of timer brush 25, there is illumination of lamps A, B and C, in C, B, A order for left turn signal, and in A, B, C order for right turn signal. The flash traversing effect respectively from right to left, or left to right is followed by an interval of minimum steady brilliancy.

The duration of the successive light flashes in a traverse may be the same or may be different. In the embodiment of Figure 1, the duration of the last flash in each traverse is made longer than the two preceding flashes by having timer-contact 23 subtend a longer arc than either timer-contacts 21 or 22. I have found a 50 per cent longer arc for contact 23 is suitable. The greater duration of light intensity variation in the final light section is preferable because under many conditions it increases the effectiveness of the signal. Contacts 21 and 22 may be substantially equal, but, if unequal, contact 22 preferably has the longer arc, as illustrated in Fig. 1.

The interval between traverses in the embodiment of Figure 1 is substantially equal to the duration of a traverse, because the arc subtended by inactive timer-contact 24 is substantially equal to the total of the arcs subtended by timer-contacts 21, 22 and 23. This relation may be changed over a considerable range without substantially detracting from signal effectiveness under normal conditions. However, the interval between traverses preferably is substantially as great as the duration of a traverse, in order to accentuate visual uni-directional sequence under normal conditions. For some combinations, particularly with three-section sequential signalling, such, for example, as produced by the embodiments of Figs. 1 to 7 and 10 to 18, inclusive, a time-interval between traverses greater than the duration of a traverse more effectively retains visual uni-directional sequence under abnormal conditions such as, for example, when light B is burned out.

With the connections illustrated in Figure 1, the duration of the light crest when stop switch 201 alone is closed is approximately 50% of each cycle, because the arc subtended by contact 24 is substantially equal to the total of the arcs subtended by contacts 21, 22 and 23. I find this relation preferable to increase the distinction between stop and direction signals.

Under certain conditions, the stop signal light crest may be wanted a smaller percentage of the total cycle than the above approximate 50%. This can be produced by the omission of the connection between switch contacts 64 and 65 and/or the omission of the connection between switch contacts 68 and 69 (see Fig. 15). The omission of the connection between contacts 64 and 65 reduces the duration of the light crest by the amount determined by timer contact 21 and the omission of the connection between contacts 68 and 69 reduces the duration of the light crest by the amount determined by timer contact 23.

The gaps between the adjacent edges of the segment contacts of timer 20 are shown smaller than the width (arc of contact) of brush 25, so that contact is made by the leading edge of brush 25 with the leading edge of a contact before the trailing edge of brush 25 has broken contact with the trailing edge of the next preceding (counter-clockwise as illustrated) contact. Therefore, for a left turn signal, light B is energized shortly before light C is de-energized, and light A is energized shortly before light B is de-energized. This overlapping effect can be increased by increasing the width of brush 25 and may be decreased to zero by making the width of the gap between timer-contacts 21 and 22 and the gap between timer-contacts 22 and 23 equal to the width of brush 25. Further time separation of adjacent light crests may be secured by making the width of brush 25 less than the width of the gaps between timer-contacts 21 and 22, and 23 and 24. This feature is illustrated in Fig. 3. I have found that a moderate degree of overlapping of the order of 10 to 20 per cent produces a superior effect.

Approximately one hundred per minute is a suitable frequency of traversing for direction signalling and a suitable frequency of flashing for stop light purposes, although this frequency may vary widely from this figure without material impairment of signal efficiency.

Under some conditions it may be desirable to increase the differentiation between the stop signal and the direction signals by different frequencies for flashing and traversing. Figure 15 also illustrates modifications to the timer-contacts to produce a stop signal frequency twice that of the direction signal traversing. Dead timer-contact 24 of Fig. 1 is replaced by live timer-contact 22a, of substantially the same arc as contact 22 and placed 180° therefrom, and the remaining space (save for gaps between contacts) is taken up by dead contacts 24a and 24b. Timer-contact 22a is connected to switch contact 65 by wire 122a, and the connections between contacts 64 and 65 and between 68 and 69 are omitted. With direction switch 202 in neutral position, timer-contact 22a is connected to wire 122 through switch contacts 63, 53 and 65 and with each revolution of timer brush (when a stop switch 201 is closed) lamp B is energized at full voltage twice, once from contact 22 and once from contact 22a, and thus the frequency of flashing for stop signal is twice the speed of the timer brush. When direction switch is turned either to left or right, the connection to timer-contact 22a is broken by switch contact 53 and the other timer connections become as hereinabove described under said conditions, which results in a direction signal traversing frequency of one per revolution of the timer brush. If it is desired to have the stop signal flashes grouped instead of evenly timed, for example, 24a can be connected in place of 22a to switch contact 65. This connection produces two closely timed flashes and a pause before repeating.

Another method of producing different stop flash and direction traverse frequencies is illustrated in Figure 16. A resistor Rg is connected in wire 126 which supplies the timer motor; wire 127 connected on the motor side thereof connects to switch contact 91a; and there is a connection between switch contacts 91 and 90a. When direction switch 202 is in neutral position, and stop switch 201 is closed, full voltage is impressed on motor 30 through switch contacts 90a, 91a, and wire 127, thus causing the motor to revolve at maximum speed. When direction switch 202 is turned either to left or right position, the above full voltage motor supply is interrupted and the voltage impressed is reduced by the drop through resistor Rg, thus reducing the motor speed. Thus a lower frequency is secured for the traversing signal than for the stop signal. By similar connections (not shown) such, for example, as by placing Rg in shunt with the motor armature and connecting switch contact 90a to common return, the stop signal frequency becomes lower than that for direction signals.

In Figure 1 and throughout the other figures the line X—Y indicates that the lamps to the right thereof are at a distance (at rear of vehicle or at front as the case may be) from the signal control switches, and motor timer, which generally are located at or near the dash of the vehicle under the control of the operator.

In case it is desired to utilize the embodiment of Figure 1 only for direction signalling, with entirely independent stop light signalling, instead of the dominance of the direction signal function illustrated in Figure 1, this may be accomplished by the omission of switch 201, connecting both wires 111 and 113 to wire 112 near lamps a, b and c and omitting wire 111 to switch 202 and contact 90 therein (see Fig. 17).

Modifications of nature similar to those of Figure 1 made to the embodiments described in the following figures produce similar changes in respect to duration of light flashes, interval between traverses, overlap of light crests, different flash and traverse frequencies, co-ordinate stop and direction signal control and the like.

Figure 2 illustrates an embodiment the same as Figure 1, except that in the light compartments K, L and M are respectively double-filament lamps A, B and C, of the type of Mazda No. 1,158, for example. The filaments 11, 12 and 13 are of smaller candle power than that of filaments 1, 2 and 3. The filaments 1, 2, 3 and 11, 12, 13 are respectively equivalent in their functioning to filaments 1, 2 and 3 respectively of lamps A, B and C and to filaments 11, 12 and 13 respectively of lamps a, b and c, of Figure 1. The apparatus of Figure 2 results in the use of one-half as many lamp sockets and lamp bulbs and, therefore, permits smaller light sections K, L and M.

In Figure 3 is illustrated an embodiment similar to that of Figure 1, but the filaments 1 and 11, 2 and 12 and 3 and 13 respectively of lamps Ac, Bb and Cc are connected in series and provision is made for lamp b to be lighted alone, and thus serve as a tail light. For this purpose, light section L is provided with a supplemental clear lens or opening so disposed that some of the light from lamp *b* illuminates the rear number plate as well as projects a red light to the rear of the vehicle, through the usual tail light lens. In this embodiment lamps *a*, *b* and *c* are of smaller candle power than lamps A, B, and C respectively, and preferably considerably smaller. For example, I have produced satisfactory results with lamps *a*, *b* and *c* each of 3 candle power, and lamps A, B and C of 15 candle power, all of the usual automobile type. In this embodiment, with the filaments of the two lamps in the same light section in series and full voltage across the two filaments, the small lamp lights substantially to full brilliancy and the large lamp is substantially dark, but when (as described below) the small lamp filament is short-circuited periodically, then the filament of the large lamp lights to full brilliancy.

The switch or switch element of the automobile lighting system which energizes the tail light is denoted by numeral 214. One side of switch 214 is connected to the battery and the other side to wire 114 and resistor R3, thence to wire 112, so that when closed, lamp *b* is energized, burns at a brilliance determined by the value of R3 and serves as a tail light. If resistor R3 is omitted lamp *b* burns at full brilliance. Switch 213 is a double-pole stop light switch, normally open and closed by depressing the foot brake pedal. Upon closing, one pole energizes wire 112, so that light *b* is lighted at full brilliancy irrespective of whether tail light switch 214 is closed. Through the other pole of switch 213 wire 125 is energized and this energizes motor-timer 20 in the same manner as described in Figure 1. Similarly, also (switch 203 being in neutral position), wire 102 is energized from brush 25 as it passes over timer contacts 21, 22 and 23, and full voltage is periodically applied for one-half revolution of brush 25, to lamp B, which results in zero voltage across lamp *b*. During the said interval, lamp B changes from substantially dark condition to full brilliancy and lamp *b* changes from substantially full brilliancy to dark. As lamp B is of considerably higher candle power than lamp *b*, there is a large increase in light emanating from section L during this time interval. After brush 25 passes out of contact with timer contact 23, wire 102 is de-energized and the initial conditions are resumed. This recurring variable-intensity light cycle alternately from lamps *b* and B continues as long as switch 213 remains closed and switch 203 remains in neutral position.

In the Figure 3 embodiment, direction switch 203 is slightly different from direction switch 202 of Figure 1, with twenty-one space-intervals around its periphery, instead of the nineteen of Figure 1, and it is, therefore, operated for left or right turn indication ½₁st of a revolution from neutral (17.15°). Stationary switch contacts 61 to 69 and movable arcuate contacts 52 to 54 inclusive serve the same function as the correspondingly numbered contacts of switch 202. Arcuate contact 51 is equipped with five contact surfaces 45, in order to make contact with stationary contacts 90 to 93 inclusive. Contacts 90, 91 and 92 of switch 203 serve the same functions in switch 203 as in switch 202 of Figure 1. Contact 93 is provided to energize lamp *b* direct from the battery through contact 92 when switch 203 is operated to either left or right position. Thus, irrespective of whether switch 213 or 214, or both, are closed, if switch 203 is operated to either left or right position, all of the lamps in sections K, L and M are energized.

With switch 203 turned to the left position there is repeating uni-directional sequence of light crests from right to left across sections M, L and K in the order named; and with said switch thrown to right position there is repeating uni-directional sequence of light crests passing from left to right across light sections K, L and M in the order named. There is an interval between each traverse, similar to that described more fully in respect to Figure 1. The results secured by the embodiment of Figure 3 consist essentially in a lower value of light crests (by the candle power value of lamps *a*, *b* or *c*, as the case may be), than in the Figure 1 embodiment, because in the Figure 3 embodiment the lamps in any light section come to full brightness alternately.

If it is desired to utilize the light sections at or near the front of the vehicle for the dual purpose of illumination and direction signalling, switch 214 becomes the switch or switch element of the usual lighting switch which controls lamps *a* and *b*, and sections K and M may be respectively left and right cowl lights or side lights, for example, and section L located midway between, all with forward-facing aspects. The lens through which the light passes from lamps A, B and C preferably should be light amber, in case some color change from the usual white should be found desirable. Resistor R3 and brake-switch 213 are omitted. Wire 112 is connected to switch contact 90 in place of wire 111 and wire 111 is connected to lighting switch 214. When switch 214 is closed, lamps *a* and *c* light to full brightness, but when switch 203 is thrown either to left or right position, all three lamps *a*, *b* and *c* light and the traversing effect is produced as described above for direction signal.

In the embodiment of Figure 4, are illustrated three light sections K, L and M, each with a single lamp, respectively A, B and C, having single filaments respectively 1, 2 and 3. These lamps connect respectively with wires 101, 102 and 103 for full voltage energization from the battery through timer 20 and switches 201 and 202 of Figure 1. Resistors R₁, R₂ and R₃ are connected respectively to wires 101, 102 and 103. The other terminals of resistors R₁ and R₃ are connected to wire 111, and the other terminal of resistor R₂ is connected to wire 112.

With the switch 202 in neutral position, when switch 201 is closed by depression of the brake pedal, light B is energized from the battery through wire 112 and resistor R₂, the resistance of said resistor being sufficient to reduce the brightness of lamp B to a fraction of its full brilliancy. With rotation of brush 25 of timer 20, resistor R₂ is short-circuited by the supply of full voltage from the battery direct to lamp B over wire 102, through timer contacts 21, 22 and 23, wires 121, 122 and 123 and the contacts of swtch 202, as described in Figure 1 embodiment. There is thus afforded (as long as switch 201 is closed and switch 202 remains in neutral position) a variable-light intensity stop signal from section L, resulting from the alternate full voltage and partial voltage supplied to lamp B through the apparatus and operation thereof, as described above.

Upon direction switch 202 being actuated to either left or right position, all three lamps A, B and C are energized through resistors R₁, R₂, and R₃ and wires 111 and 112, switch contacts 90, 91, 92 and 51 from the battery. The simultaneous energization and rotation of the motor timer 20 through wire 125 applies battery voltage direct in repeating uni-directional sequence to the lamps C, B and A in the order named for left position of switch 202, and in the reverse sequence when said switch is in right position. The light crests occur during the respective contacts between brush 25 and timer contacts 21, 22 or 23, as connected to the lights through switch 202 for that position of switch 202. The same type of signal is produced as described in respect to the embodiment Figure 1, with the utilization of resistors $R_1$, $R_2$ and $R_3$, and the reduction of supply wires to the light sections to a total of three.

Figure 5 illustrates an embodiment of the invention in which one set of light sections K, L and M, is mounted with rearwardly facing aspects on the rear of the vehicle and another set, designated by N, O and P, is mounted with forwardly facing aspects preferably at or near the front of the vehicle, the purpose of the last three named light sections being for direction signal to pedestrians, operators of other vehicles, traffic officers, etc., forwardly of the vehicle. Light sections N, O and P are placed preferably in line, from left to right of the vehicle in the order named. In these light sections are lamps D, E and F respectively, with filaments 4, 5 and 6 respectively.

Provision is also made, as described below, for light sections N and P to provide illumination to the front of the vehicle when desired, except only when a turn to the left, or to the right, is being signalled. For these reasons, the lenses through which the light passes from lamps D, E and F preferably should be light amber, in case some color change from the usual white should be found desirable. Light sections N and P may either be cowl lights, or they may be in the head lights of the car, or they may be otherwise independent.

The apparatus and method of operation of the embodiment of Figure 5 is similar to that illustrated in Figure 4, in which use is made of periodically short-circuited resistors. Switch 215 is the usual switch, or switch element, for controlling the cowl lights, or head lights, as the case may be. When this switch is closed, and switch 204 is in neutral position (as illustrated), supply from battery 39 energizes lamps D and F in front light compartments N and P respectively at full voltage from wires 151 and 152, through switch contacts 66, 54 and 68 and wire 141 for lamp D, and through switch contacts 61, 52 and 63, and wire 143 for lamp F. Under this condition, lamp E in light section O is not energized and is dark. This affords illumination to the front of the vehicle in the regular way.

When switch 201 is closed by the depression of the brake pedal, there is no change in lamp sections N, O and P, but through wire 125 battery voltage is supplied to the motor-driven contactor 20 and its brush 25 rotates (as hereinabove described). Simultaneously, lamp B in rear compartment L is energized through resistor $R_2$ and wire 112. With the rotation of brush 25, resistor $R_2$ is periodically short-circuited one-half of each modulation cycle, and during said short-circuited period full voltage is applied to lamp B, partial voltage being applied during the remainder of each such cycle due to the voltage drop through resistor $R_2$. This full voltage supply is secured through wires 121, 122 and 123, from timer contacts 21, 22 and 23 respectively, connected together to wire 102 through switch contacts 70, 55 and 72, and switch contacts 74, 56 and 76.

Direction switch 204 is illustrated with 36 space intervals, so that for left signal indication it is rotated counter-clockwise 10°, and for right signal indication it is rotated clockwise 10°, from the neutral position illustrated. Upon operation to left, irrespective of whether switch 201 and/or switch 215 are closed, battery voltage is supplied from wire 150 to contact 92 and through movable arcuate contact 51 to contacts 90, 91, 93 and 94. From contact 90, through wire 111, resistors $R_1$ and $R_3$, and wires 101 and 103, lamps A and C are energized. From contact 91, through wires 112 and 102, and resistor $R_2$, lamp B is energized and through wire 125 the motor-timer is energized and rotates, as hereinbefore described. From contact 93 through resistor $R_{12}$ and wire 142, lamp E is energized and from contact 94, through resistors $R_{11}$ and $R_{13}$, and wires 141 and 143, lamps D and F are energized. Simultaneously, wire 121 from timer contact 21 is connected to wire 143 through switch contacts 62, 53 and 64, and to wire 103 through switch contacts 69, 55 and 71; wire 122 from timer contact 22 remains directly connected with the wire 102 and is connected to wire 142 through switch contacts 77, 57 and 78; wire 123 from timer contact 23 is connected to wire 141 through switch contacts 65, 54 and 67, and to wire 101 through switch contacts 73, 56 and 75. Direct connection between the battery and lamps N and P through wires 141 and 143 and switch 215 respectively is broken in this switch position.

With these connections, there are produced, by the sequential short-circuiting of resistors $R_3$, $R_2$ and $R_1$ in order, repeating uni-directional traverses of light crests from right to left of vehicle, as viewed in rear, across light sections M, L and K, in the order named, and synchronously therewith by the sequential short-circuiting of resistors $R_{13}$, $R_{12}$ and $R_{11}$ in order, repeating uni-directional traverses of light crests from right to left of vehicle, as viewed in front, across light sections P, O and N, in the order named. These signals indicate to observers in both front and rear of the vehicle, and to some extent at the sides, that a left turn of the vehicle is intended. This condition continues as long as switch 204 remains in left position.

When switch 204 is returned to neutral position, all six lamps are de-energized and dark, except when switch 215 is closed lamps D and F in front compartments N and P burn steady at full brilliance for forward illumination, and/or when switch 201 is closed, lamp B in rear compartment L produces the stop signal hereinabove described.

Conversely upon the operation of direction switch 204 to right, battery voltage supply through contact 92 to contacts 90, 91, 93 and 94 and the operations dependent thereon, takes place as described above with left switch operation. With right operation, however, wire 121 from timer contact 21 is connected to wire 141 through switch contacts 64, 53 and 66, and to wire 101 through switch contacts 71, 55 and 73; wire 122 from timer contact 22 remains directly connected to wire 102 and is connected to wire 142 through switch contacts 79, 57 and 80; wire 123 from timer contact 23 is connected to wire 143 through switch contacts 62, 52 and 63, and to wire 103 through switch contacts 67, 54 and 69. With these connections there similarly are produced repeating uni-directional traverses of light crests from left to right of vehicle, as viewed in the rear, across light sections K, L and M, in the order named, and synchronously therewith repeating uni-directional traverses of light crests from left to right of vehicle, as viewed in the front, across light sections N, O and P, in the order named, which indicate to observers that a right turn is intended.

In case it is desired to omit the provisions, incorporated with the signal system of Fig. 5, for illumination to the front of the vehicle, switch contacts 61 and 68 and wire 152 are omitted. Then lamp N can be paired with lamp A and lamp P paired with lamp C, because the lamps in a given pair are lighted and vary together. This pairing can be produced either by connecting wire 144 to wire 111 and omitting switch contact 94; or by connecting wire 141 to wire 101, wire 143 to wire 103 and omitting switch contact 94, wire 144 and resistors $R_{11}$ and $R_{13}$ and making appropriate changes of the value of resistors $R_1$ and $R_3$. The former alternative is necessary in case it is desired that the degree of variation of the front lamps N, O and P be different from that of the rear lamps A, B and C, and has the advantage of maintaining the predetermined variation of each lamp under certain abnormal conditions, such for example, as the burn-out of the lamp paired therewith.

Lamps D, E and F in the front light sections may be the same as or different candle-power than those in the rear sections, and the percentage of light variation from crest to minimum in the front light sections may be the same as or different than that in the rear sections, depending upon the resistance of the resistors $R_{11}$, $R_{12}$ and $R_{13}$, compared with $R_1$, $R_2$ and $R_3$ and the candle-power and other characteristics of the lamps energized therethrough.

In this embodiment there are illustrated three pilot lights S, T and U connected respectively to wires 101, 102 and 103, the other pilot lamp terminals being connected to common return through wire 699. These three pilot lamps are mounted on the dash of the vehicle, or at some other place readily visible to the operator, in order to indicate the operation and condition of the rear signalling system. Lamps of small candle-power, of the usual automobile type, are suitable for this purpose, for example, Mazda No. 51 lamp. The pilot lamps preferably are connected in parallel with the rear signal lamps and arranged in line similarly to the corresponding signal lamps in order to present to the eye of the driver a close replica of the signal light effects produced. Similar pilot lamps may be likewise included in other embodiments of the invention, particularly those of Figures 4, and 6 to 13 inclusive. Alternatively pilot lights may be connected in parallel with the series resistors illustrated in a number of the embodiments.

Figure 6 illustrates an embodiment of the invention with rear signal indication alone, similar to that of Figure 4, utilizing periodically short-circuited resistors for the modulation of voltages applied to the signal lamps A, B and C. In the Figure 6 embodiment, however, all three lamps are illuminated and simultaneously modulated for stop signal indication upon the closing of switch 201, instead of the illumination only of lamp B. This three-lamp illumination is desirable under some conditions, particularly, for example, where a much larger light flux change is desired for stop signal indication, or where sufficient directional signal effectiveness is secured with smaller lamps. With three-position direction switch 205 in neutral position, as illustrated, when switch 201 is closed by the depression of the brake pedal, lamps A, B and C are energized from battery 39 through wires 125 and 112 and resistors $R_1$, $R_2$ and $R_3$, and wires 101, 102 and 103 respectively. Timer contacts 21, 22 and 23 are tied together and to wires 101, 102 and 103 through switch contacts 62, 64, 67 and 52, and through switch contacts 68, 71, 73 and 53. Upon the actuation of switch 205 to either left or right position (irrespective of whether switch 201 is closed) battery energy passes through wire 150, and switch contacts 91 and 51 to contact 90, and thence energizes lamps A, B and C through wire 112, as above described.

When switch 205 is actuated to left position (counter-clockwise ½nd revolution) to signal left turn, timer contact 21 is connected through wires 121 and 103 to lamp C by means of switch contacts 62, 63, 52 and 65, and timer contact 23 is connected to lamp A through wires 101 and 123 through switch contacts 70, 53 and 72. Conversely, when switch 205 is operated to the right (clockwise ½nd revolution) to signal right turn, timer contact 21 is connected through wires 121 and 101 to lamp A by means of switch contacts 69, 53, 72 and 73, and timer contact 23 is connected to lamp C through wires 103 and 123 and through switch contacts 63, 52 and 65. In both left and right positions of the switch, timer contact 22 is connected direct to lamp B through wires 102 and 122.

Therefore, by the repeated contact of brush 25 in turn with timer contacts 21, 22 and 23, there is produced in the manner above described a repeating unidirectional sequence of light crests from left to right, or right to left, as the case may be, across light sections K, L and M, to indicate respectively a right hand or a left hand turn.

Another embodiment of the invention is illustrated in Figure 7, in which two lamps A and C are illuminated and flash simultaneously for stop signal, and all three lamps A, B and C are illuminated for direction signal with a traversing light effect, utilizing resistors $R_1$, $R_2$ and $R_3$ in series with the lamps, as is done in the embodiments illustrated in Figures 4, 5 and 6. With three-position direction switch 206 in neutral position, as illustrated, when brake switch 201 is closed by depression of the brake pedal, motor-timer 30 is energized through wire 125, as above described, and lamps A and C are energized through resistors $R_1$ and $R_3$ respectively, and wires 111, 101 and 103. In neutral position of switch 206, timer contacts 21, 22 and 23 are connected together and to wires 101 and 103, through switch contacts 52, 62, 64 and 67, and through switch contacts 54, 69, 72 and 74. As timer brush 25 rotates, during one-half revolution through these connections it short-circuits resistors $R_1$ and $R_3$ and applies full voltage simultaneously to lamps A and C and these, consequently, produce a flashing stop signal in unison. This dual-light stop signal has the advantage of retaining an effective stop signal in the event, for example, that one of the two lamps A or C is burned out.

When direction switch 206 is operated to either left or right position, ½₆th of a revolution counter-clockwise, or clockwise, respectively, lamps A, B and C are all energized through resistors $R_1$, $R_2$ and $R_3$, switch contacts 51, 90, 91 and 92, and wires 101, 102, 103, 111, 112, 125 and 150, and motor-timer is energized through wire 125 and brush 25 rotates in clockwise direction. When switch 206 is thrown to left position to indicate left turn, lamp C is connected to timer contact 21 through wires 103 and 121, and switch contacts 61, 63, 52 and 66; lamp A is connected to timer contact 23 through wires 101 and 123, and switch contacts 71, 54 and 73 and lamp B is connected to timer contact 122 through wires 102 and 122, and switch contacts 67, 53, and 68. Conversely, when switch 206 is turned to right position to indicate right turn, lamp A is connected to timer contact 21 through wires 101 and 121, and switch contacts 70, 54, 73 and 75; and lamp C is connected to timer contact 23 through wires 103 and 123, and switch contacts 63, 52 and 65; and lamp B and timer contact 22 are connected through wires 102 and 122, and switch contacts 68, 53 and 69.

Therefore, by the repeated contact of brush 25 in turn with timer contacts 21, 22 and 23, there is produced in the manner above described a repeating unidirectional sequence of light crests from right to left or left to right, as the case may be, across light sections K, L and M, to indicate left and right turn respectively.

This embodiment is readily adapted for use on the front or forward end of the vehicle for the dual purpose of illumination and direction signalling, similarly to the embodiment of Figure 3. Switch 201 becomes the switch, or switch element of the usual lighting switch, which controls cowl lights, side lights, or head lights, for example. Wire 126 is connected to wire 112 instead of to wire 125 so that timer motor is energized only when switch 206 is operated to left or right position. In case it is desired that lamps A and C burn at full, rather than partial brightness for illumination, resistors R1 and R3 are short-circuited only when switch 206 is in neutral position, by connections (shown dotted) through switch contacts 89a, 90a and 91a to wires 101 and 103.

The embodiment of Figure 8 also makes use of three lamps, A, B and C, in rearwardly facing light sections K, L and M, respectively in which lamp B alone is utilized for stop signal, lamps B and A are utilized for left turn signals, and lamps B and C for right turn signals. This embodiment is of advantage under some signal arrangements, such, for example, as the use of arrow-shaped light openings or lenses in sections K and M, pointing respectively to left and right, or, for example, with the utilization of different color lenses for sections K and M than for section L.

When switch 201 is closed by operation of the brake pedal, and switch 207 is in neutral position (illustrated), battery supply energizes motor-timer through wire 125, and lamp B through wires 102 and 112 and resistor R2. Lamp B is connected to timer contacts 22 and 23 through wires 102 and 122, and switch contacts 63, 52 and 66. In this embodiment, timer-contact 21 is eliminated and the total of the arcs subtended by contacts 22 and 23 is substantially 180°. With the above switch positions, lamp B gives flashing stop signal as described in respect to foregoing figures. When direction switch 207 is operated to left position, ¼th revolution counter-clockwise, contacts 90 and 60 are supplied from the battery through contacts 91 and 51, and motor-timer is energized and rotates; lamp A is energized through wires 101 and 111, and resistor R1; and lamp B is energized through wires 102 and 112 and resistor R2. Simultaneously, lamp A is connected to timer-contact 23 through wires 101 and 123 and switch contacts 62, 52 and 65. Lamp B, as in all other positions of switch 207, is solidly connected to contact 22 through wires 102 and 122. There is thus produced a repeating uni-directional sequence of light crests in right to left direction across the two light sections L and K, in the order named, which indicates a left turn. The interval between each traverse of light crests in this embodiment is approximately equal to the total time of the traverse. When direction switch 207 is thrown to right position, ¼th revolution clockwise, for right signal, contacts 90 and 61 are energized from battery through contacts 91 and 51, thereby energizing lamp B through resistor R2 and wires 102 and 112, motor-timer through wire 125 and lamp C through wires 103 and 113 and resistor R3. Simultaneously, timer-contact 23 is connected to lamp C through wires 103 and 123, and switch contacts 64, 52 and 67. There is thus produced in the right position of switch 207 a repeating unidirectional sequence of light crests from left to right across light sections L and M, in the order named, which indicates a right turn.

In the embodiment of Figure 9 there are two light sections K and L containing respectively lamps A and B, in which both flash simultaneously for stop signal, and both flash sequentially for direction signals. This arrangement has the advantage of utilizing two lamps for all of the signals, but the traversing effect from the repeating uni-directional sequence of light crests using two lamps for direction signalling is not as great as with more lamps used (this applies to Figure 8 also). The timer-contact arrangements in this embodiment are the same as in Figure 8. When switch 201 is closed by depression of the brake pedal, and direction switch 208 is in neutral position (illustrated), battery supply energizes motor-timer through wire 125 and both lamps A and B through wires 101, 102 and 112, and resistors R1 and R2. The repetitive flashing of both lamps ensues, as hereinabove described, for stop signal. When direction switch 208 is operated to left position, ⅛th revolution counter-clockwise, contact 90 is supplied from the battery through contacts 91 and 51, motor-timer is energized and lamps A and B are energized through wires 101, 102 and 112, and resistors R1 and R2. Simultaneously, lamp B is connected to timer-contact 22 through wires 102 and 122, and switch contacts 52, 61, 64 and 65; and lamp A is connected to timer-contact 23 through wires 101 and 123, and switch contacts 53, 66 and 69. There ensues a repeating uni-directional sequence of light crests in sections L and K, in the order named, indicative of a left turn. Conversely, when switch 208 is operated to right position, ⅛th revolution clockwise, both lamps A and B are energized through the same means as for left turn; simultaneously, lamp A is connected to timer-contact 22 through wires 101 and 122, and switch contacts 68, 53 and 71; and lamp B is connected to timer-contact 23 through wires 102 and 123, and switch contacts 63, 52, 66 and 67. There ensues a repeating uni-directional sequence of light crests in sections K and L, in the order named, indicative of a right turn.

A four-light section embodiment is illustrated in Figure 10 for stop and direction signalling in the rear of vehicle. Light sections K, L, M and N are equipped with lamps A, B, C and D respectively. Lamps B and C flash simultaneously for stop signal, lamps C, B and A flash sequentially in the order named, for left signal, and lamps B, C and D flash sequentially in the order named, for right signal. This embodiment is advantageous under some signal arrangements such, for example, as the use in sections K and N of arrow-shaped openings, or lenses, with the arrows pointing respectively to left and right, or, for example, with the utilization of different color lenses for sections K and N, than for sections L and M.

When switch 201 is closed by depression of the brake pedal, and switch 209 is in neutral position (illustrated), battery supply energizes motor-timer through wire 125, and lamps B and C through wires 102, 103 and 112, and resistors $R_2$ and $R_3$. Lamps B and C are connected to timer contacts 21 and 22 through wires 102, 103, 121 and 122 and switch contacts 71, 54 and 74, and 66, 53, 69 and 70. With the above switch positions, lamps B and C flash simultaneously as described above, the flash duration, it will be noted being shorter because only timer-contacts 21 and 22 are utilized.

When direction switch 209 is operated to left position, $\frac{1}{22}$nd revolution counter-clockwise, irrespective of the position of switch 201, direction switch contacts 90 and 91 are supplied direct from the battery through contact 92, thereby energizing lamp A through wires 101 and 111, and resistor $R_1$; lamps B and C through wires 102, 103 and 112, and resistors $R_2$ and $R_3$; and motor-timer through wire 125. Simultaneously, lamp C is connected to timer-contact 21 through wires 103 and 121, and switch contacts 65, 53, 68 and 69; lamp B is connected to timer-contact 22 through wires 102 and 122, and switch contacts 70, 54, and 73; and lamp A is connected to timer-contact 23 though wires 101 and 123, and switch contacts 61, 52 and 62. There ensues a repeating uni-directional sequence of light crests across lamps M, L and K, in the order named, indicating a left turn.

Conversely, when direction switch 209 is operated to right position, $\frac{1}{22}$nd revolution clockwise, switch contacts 91 and 93 are energized from the battery through contacts 51 and 92; lamps B and C are energized through wires 102, 103 and 112, and resistors $R_2$ and $R_3$; lamp D through wires 104 and 114, and resistor $R_4$; and motor-timer through wire 125. Simultaneously, lamp B is connected to timer-contact 21 through wires 102 and 121, and switch contacts 72, 54 and 75; lamp C is connected to timer-contact 22 through wires 103 and 122 and switch contacts 67, 53, 70 and 71; and lamp D is connected to timer-contact 23 through wires 104 and 123, and switch contacts 63, 52 and 64. There ensues a repeating uni-directional sequence of light crests across lamp sections L, M and N, in the order named, indicative of right turn.

Figure 11 illustrates an embodiment of the invention with three light sections K, L and M, for indicating stop and direction signals, in which are lamps A, B and C respectively, and the light variations are bright-and-dark (on-and-off), instead of the variable brilliancy (but always visible) conditions of the signals Figures 1 to 10 inclusive. When switch 201 is closed by depression of the brake pedal, and direction switch 210 is in neutral position (illustrated), battery supply energizes motor-timer through wire 125. Lamp B is connected to timer contacts 21, 22 and 23, through wires 102, 121, 122 and 123, and switch contacts 63, 53 and 65, and 67, 54 and 69. Lamp B is energized approximately ½ of each revolution of brush 25 and burns at full brilliancy. During the other ½ revolution, lamp B is completely de-energized and becomes dark. There is thus produced a blinking, or on-and-off, illumination for the stop signal. When direction switch 210 is operated to left position, $\frac{1}{17}$th revolution counter-clockwise, to indicate left turn, battery energy is supplied to motor-timer through wires 125 and 150, and switch contacts 90, 91 and 51. Simultaneously, lamp C is connected to timer contact 21 through wires 103 and 121 and switch contacts 62, 53 and 64; lamp B remains connected to timer contact 22 through wires 102 and 122; and lamp A is connected to timer contact 23 through wires 101 and 123 and switch contacts 66, 68 and 54. There then ensues a repeating uni-directional sequence of on-and-off light flashes in light sections M, L and K, in the order named, indicating a left turn. Conversely, when switch 210 is operated to right position, $\frac{1}{17}$th revolution clockwise, motor-timer is energized as in left position; lamp A is connected to timer contact 21 through wires 101 and 121 and switch contacts 64, 53 and 66; lamp B remains connected direct to timer contact 22 through wires 102 and 122; and lamp C is connected to timer contact 23 through wires 103 and 123 and switch contacts 61, 52 and 62. There thus ensues a repeating uni-directional sequence of on-and-off flashes in light sections K, L and M, in the order named, indicating a right turn.

In the embodiments of Figures 1 to 11 inclusive, the apparatus illustrated produces, in the direction signal functions, sequences of light crests above a lower level of brightness (zero for Figure 11). By modifications to the timer, the direction signal may be made to be sequences of light dips below a high level of brightness. Figure 14 illustrates one of the methods of producing this "dip" effect. Timer brush 25, brush arm 26 and timer contacts 21, 22, 23 and 24, or the equivalent (for 3-light direction signalling) are replaced by cam 511 mounted on worm gear shaft 27, with lobe 512 covering approximately 60°. Disposed at approximately 60° intervals about the center of the shaft are three contact arms, 515, 516 and 517, relatively insulated from each other and from cam 511, pivoted respectively at axes 518, 519 and 520, and each equipped with a rider 513 through which the cam lobe actuates them in turn, when it rotates (illustrated clockwise). At the opposite end of each contact arm from the rider is mounted a contact, respectively 531, 532 and 533 on arms 515, 516 and 517. Fixed contact 521 is connected to wire 121, fixed contact 522 is connected to wire 122 and fixed contact 523 is connected to wire 123 in the foregoing embodiments (except Figure 9), and arm contacts 531, 532 and 533 are all connected together and to wire 125. Contacts 521—531, 522—532 and 523—533 are normally closed and are opened only when the asosciated contact arm is actuated by cam lobe 512 passing under rider 513 attached to the respective arm.

Upon the rotation of shaft 27, during substantially ½ revolution cam lobe 512, therefore, successively opens the connections through these contacts direct from wire 125 to wires 121, 122 and 123 in turn, and during the remaining ½ revolution these connections remain closed. It is thus apparent that lamps A, B and C, etc. (connected to wires 121, 122 and 123, as determined by the switching connections in the respective embodiments hereinabove described) are normally energized at full voltage through wire 125 and the aforesaid contact arm contacts, and that only when a contact opens is a lamp either dimmed by its supply being diverted through resistors, or entirely darkened by total interruption of its supply, as the case may be. In this modification, overlapping of light dips may be varied by making the cam lobe cover a greater or less arc than 60°. By spacing the contact arms more ar less than 60°, the interval between traverses may be changed. Longer duration of the final event in a traverse may be secured by a wider rider 513 on contact arm 517. Therefore, it is apparent that for direction signalling there is produced a repeating uni-directional sequence of light dips (instead of light crests) across the adjacent light sections. The sequence of light crests is preferable in many applications of signalling, but the substitution of light dips may be desirable under some conditions.

The embodiment of Figure 12 also makes use of three lamps, A, B and C, in rearwardly facing light sections K, L and M, respectively, in which lamp B alone is utilized for stop signal and all three lamps are utilized for left and right signal. In this embodiment impulse transformers described in co-pending application No. 689,556 (file 4,211) are utilized, one for each lamp. When switch 201 is closed by depression of brake pedal, and direction switch 211 is in neutral position (illustrated), the battery supply energizes timer motor through wire 126, impulse transformer 302 through wire 112 and lamp B through secondary coil 322 of said impulse transformer and wire 102. The other terminal of primary coil 312 of impulse transformer 302 is connected to timer contacts 21, 22 and 23, through wires 132, 121, 122 and 123 and switch contacts 63, 53 and 65, and 67, 54 and 69. In this embodiment timer brush 25 is connected to common return by wire 129. As timer brush 25 rotates, while it is in contact with timer contacts 21, 22 and 23, and allows current to flow through primary coil 312, because of opposing magnetic relations between the primary and secondary coils of impulse transformer 302, there is induced in secondary coil 322 a voltage additive to the battery voltage, and the brightness of lamp B increases. For the remaining approximately ½ revolution of brush 25, primary coil 312 is de-energized and during this period the reversal of magnetic flux in transformer 301 induces a voltage in secondary coil 322, opposing the battery voltage, thus decreasing the brightness of lamp B. Therefore, there results an alternating increase and decrease in the brightness of lamp B, which produces a distinctive stop signal.

When direction switch 211 is operated to left position, 1/19th revolution counter-clockwise, contacts 90 and 91 are energized from the battery through contacts 92 and 51; timer motor is energized; impulse transformer 302 and lamp B are energized through wires 102 and 112 as above described; impulse transformers 321 and 323 are energized through wire 111; lamp A is energized through wire 101 and secondary coil 321 of impulse transformer 301; and lamp C is energized through wire 103 and secondary coil 323 of impulse transformer 303. Simultaneously, primary coil 313 of impulse transformer 303 is connected to timer contact 21 through wires 133 and 121, and switch contacts 62, 53 and 64; primary coil 312 of impulse transformer 302 remains connected with timer contact 22 through wires 132 and 122; and primary coil 311 of impulse transformer 301 is connected with timer contact 23 through wires 131 and 123, and switch contacts 66, 54 and 68. As brush 25 rotates and passes in turn over timer contacts 21, 22 and 23, during the intervals of contact therewith it completes the circuit respectively through primary coils 313, 312 and 311, in the order named. During said intervals of activity of said primary coils there is induced in the respective secondary coils, 323, 322 and 321, a voltage additive to the battery voltage, which causes increases in the brilliancy of lamps C, B and A, in the order named, and a sequence of light crests, therefore, traverses the lamp sections M, L and K, in the order named. However, as the trailing edge of timer brush 25 leaves the trailing edge of timer contacts 21, 22 and 23 respectively, and thereby interrupts the current through the primary coil connected thereto, there is induced in the associated secondary coil a voltage opposed to the battery voltage and there is a decrease in the brilliancy of the lamp connected to said secondary. Each event in a light section comprises a light crest followed by a light dip in that section. It is also apparent in each traverse, the light crest in one section has closely associated with it (i. e., following it) a light dip in the adjacent (trailing) section, immediately to the right of it for a left signal or immediately to the left of it for a right signal.

Conversely, when direction switch 211 is operated to right position, 1/19th revolution clockwise, contacts 90 and 91 are energized from battery through contacts 92 and 51; timer motor is energized, impulse transformers 301, 302 and 303 are energized and lamps A, B and C are energized through their respective secondary coils 321, 322 and 323, and wires 101, 102 and 103, as described above under left position switch connections. Simultaneously, primary coil 311 of impulse transformer 301 is connected to timer contact 21 through wires 131 and 121, and switch contacts 64, 53 and 66; primary coil 312 of impulse transformer 302 remains connected to timer contact 22 through wires 132 and 122; and primary coil 313 of impulse transformer 303 is connected to timer contact 23 through wires 133 and 123, and switch contacts 61, 52 and 62. There thus ensues a unidirectional sequence of light crests, with immediately following light dips, from left to right in sections K, L and M, in the order named, indicative of a right turn.

There are preferably included condensers 306 across the primary coils 311, 312 or 313 to reduce contact sparking and also there are shown ballast resistors 307 in wires 131, 132 and 133, to limit the maximum current in each primary coil, all as described in my United States Patent 2,082,789, dated June 8, 1937.

Figure 13 illustrates an embodiment of the invention in which three light sections K, L and M, are utilized for stop and direction signalling, lamps A and C in light sections K and M being lighted for stop signal and lamps A, B and C in sections K, L and M being all lighted for direction signal, with the traversing light effect similar to that described in the foregoing for direction signalling. However, in the embodiment of Figure 13, the frequency of the stop signal flashing is entirely independent of the frequency of traversing for direction signal.

Numeral 201 designates the usual stop switch, closed by the depression of the foot brake pedal. The direction signal is controlled by switch 212, which is illustrated in neutral position. Upon the closing of switch 201, lamps A and C are energized through wires 111, 101 and 103 and resistors R₁ and R₃. Simultaneously, the battery is connected by wire 115 to contact 64 of direction switch 212 through contactor 420. Contactor 420 comprises relatively insulated contacts 426 and 427 connected in wire 115, which contacts are closed by cam 422 on shaft 421, when cam lobe 424 passes under rider 425. Shaft 421 is the speedometer shaft, or is driven from the wheels of the vehicle, so that its speed is proportional to the speed of the vehicle. As shaft 421 rotates, for approximately ½ of the time contacts 426 and 427 are closed and during that interval full voltage is supplied through wire 115 and wires 101 and 103, and switch contacts 63, 64, 66 and 53 to lamps A and C. During the other ½ revolution of the shaft 421, contacts 426 and 427 are open and lamps A and C are lighted to partial brilliancy, as determined by the values of resistors R₁ and R₃. Therefore, the frequency of flashing for the stop signal is carried out in the same manner as hereinabove described, but the frequency of this flashing is dependent upon the speed of the vehicle. When the vehicle is stationary, the flashing ceases and lamps A and C remain burning at either full or partial brightness, depending upon the position of cam lobe 424.

However, irrespective of whether switch 201 is closed and the speed of the vehicle, when switch 212 is operated either to left position ⅛th revolution (counter-clockwise), or to right position ⅛th revolution (clockwise), then the direction signal function dominates and the frequency of traversing is the substantially constant value determined by motor-timer 20, as described hereinbefore. Upon such actuation to left or right position of switch 212, switch contacts 90, 91 and 92 are connected by movable contact 51 and lamps A, B and C are energized through wires 111, 112, 101, 102 and 103, and resistors R₁, R₂ and R₃. Simultaneously, for left position of switch, lamp A is connected to timer contact 23 through wires 101 and 123 and switch contacts 53, 62 and 65; lamp C is connected to timer contact 21 through wires 103 and 121, and switch contacts 67, 68 and 54. Conversely, for right position of switch, lamp A is connected to timer contact 21 through wires 101 and 121 and switch contacts 61, 52 and 62; lamp C is connected to timer contact 23 through wires 103 and 123 and switch contacts 65, 67 and 53. For all positions of switch, lamp B is connected to timer contact 22 through wires 102 and 122.

Thus there ensues a repeating uni-directional sequence of light crests for left turn signal, or from left to right for right turn signal, in the manner similar to the embodiments described in the foregoing Figures 1 to 10.

In case it is desired under some conditions to have the stop light burn steadily (without flashing) when direction switch 212 is in neutral position, contactor 420 is omitted and wire 115 runs direct from switch 201 to contact 64 of direction switch 212. If it is desired to have lamps A and C light to partial brilliancy, instead of to full brilliancy under this condition, wire 115 is omitted entirely and the brightness of lamps A and C is determined by the voltage drop through resistors R₁ and R₃ supplied from wire 111.

A steady-burning stop light (with dominance of the direction signal function) can readily be secured in the various other embodiments. For example, in the Fig. 1 construction, wire 126 would be connected to wire 111 instead of to wire 125, the connection between switch contacts 64 and 65, and that between switch contacts 68 and 69 would be omitted and wire 112 tapped to switch contact 65. Thus with direction switch in neutral position, when brake switch 201 is closed, lamp b is energized through wire 112 and lamp B is energized through wire 112, switch contacts 63, 53 and 65 and wire 102, and both lamps burn steady (non-flashing). As applied to the embodiment of Fig. 7, for example, the modifications required for a steady-burning stop signal are the same as those above described in connection with Fig. 7 for front illumination and direction signalling, except that switch 201 remains the brake switch. It is also apparent that for the steady-burning stop light some of the live direction switch contacts can be omitted.

Under some conditions it may be desired to produce the change in sequence of light crests and/or dips, for left turn and right turn indication, by reversing the direction of the timer motor 30 and therefore that of timer brush 26. Fig. 18 illustrates the apparatus and method of securing the same signals as those produced by the embodiment of Fig. 7 but utilizing a reversing timer motor. In the Fig. 18 embodiment both terminals of the timer motor field 32 are connected by wires 126 and 127 and one terminal of the timer motor armature 31 is connected by wire 128, to contacts of the direction switch 213, as described in detail below. The motor revolves timer brush 25 in a clockwise direction for left turn signal and in counter-clockwise direction for right turn signal. When direction switch is in neutral or middle position (illustrated) and stop switch 201 is closed by depression of the brake pedal, the motor revolves timer brush 25 in counter-clockwise direction, although in this condition (stop signal) the direction of brush rotation is immaterial. In the Fig. 18 embodiment the three live timer contacts 21, 22, and 23 subtend the same arc and the longer duration of the final light crest in each traverse is produced by connecting timer contact 21a to timer contact 21 only for right turn indication and by connecting timer contact 23a to timer contact 23 only for left turn indication. The arc subtended by timer contact 21a and that subtended by timer contact 23a is approximately 50 percent of the arc subtended by timer contacts 21, 22 or 23.

With three-position direction switch 213 in neutral position, as illustrated, when brake switch 201 is closed by depression of the brake pedal, lamps A and C are energized through resistors R₁ and R₃ respectively, and wires 111, 101, and 103, and timer brush 25 is energized through wire 125. Simultaneously motor 30 is energized through direction switch contacts 92, 51 and 61, wire 126, motor field 32, wire 127, direction switch contacts 71, 55 and 72, wire 128, armature 31 and return path 499. With this connection the direction of current flow through motor field 32 is indicated by adjacent arrow marked "NR", the motor rotates in "right" direction and rotates the timer brush counter-clockwise. In the neutral position of direction switch 213, timer contacts 21, 22 and 23 are connected together and to wires 101 and 103 through switch contacts 65, 53, 66 and 68, 54, 69 and wires 121, 122 and 123. Thus as timer brush rotates, during one-half revolution, through these connections it short-circuits resistors R₁ and R₃ simultaneously and applies full voltage simultaneously to lamps A and C; the other one-half revolution there is partial voltage applied to these two lamps. Consequently there is produced a flashing stop signal which is always visible.

When direction switch 213 is operated to either left or right position one twenty-first of a revolution counter-clockwise or clockwise, respectively, lamps A, B, and C are all energized through resistors R₁, R₂ and R₃, switch contacts 51, 90, 91, and 93 and wires 101, 102, 103, 111, 112 and 150; also the connections between timer contacts 21, 22 and 23 are broken by the movement of contacts 53 and 54. Lamps A and C remain connected respectively to timer contacts 23 and 21.

When the direction switch operation is to left position, simultaneously motor 30 is energized through switch contacts 91, 51 and 73, wire 127, motor field 32, wire 126, switch contacts 62, 52 and 63, wire 128, armature 31 and return path 499, the motor rotates in "left" direction (the direction of current flow through motor field 32 being in the direction indicated by adjacent arrow marked "L") and rotates timer brush 25 clockwise. Also simultaneously, timer contact 22 is connected to lamp B through wires 122 and 102 and switch contacts 67, 54 and 68, and timer contacts 23 and 23a are connected together through wires 123 and 123—a and switch contacts 64, 53 and 65. Therefore timer brush 25 contacts in sequence live timer contacts 21, 22 and 23—23a, supplies full voltage to lamps C, B and A in the order named, the duration of said full voltage on lamp A being approximately 50% longer than on lamps C and B, and produces a repeating uni-directional sequence of light crests from right to left across sections M, L and K in the order named, to indicate a left turn.

Conversely, when the direction switch operation is to right position, simultaneously motor 30 is energized through switch contacts 93, 51 and 62, wire 126, motor field 32, wire 127, switch contacts 72, 52 and 73, wire 128, armature 31 and return path 499, the motor rotates in "right" direction (the direction of current flow through motor field 32 being in the direction indicated by adjacent arrow marked "NR") and rotates timer brush 25 counter-clockwise. Also simultaneously, timer contact 22 is connected to lamp B through wires 122 and 102 and switch contacts 66, 53 and 67 and timer contacts 21 and 21a are connected together through wires 121 and 121—a and switch contacts 69, 54 and 70. Therefore timer brush 25 contacts in sequence live timer contacts 23, 22 and 21—21a, supplies full voltage to lamps A, B and C in the order named, the duration of said full voltage on lamp C being approximately 50% longer than on lamps A and B, and produces a repeating uni-directional sequence of light crests from left to right across sections K, L and M in the order named, to indicate a left turn.

Under the three signal indication conditions described above, timer contact 24 is dead for all three, timer contacts 21a and 23a are both dead for stop indication, timer contact 21a is dead also for left signal, and timer contact 23a is dead also for right signal.

Therefore for the direction signals the interval between traverses is less than the duration of a traverse substantially by the interval required for timer brush to pass over timer contact 21a or 23a. It is apparent that the arcs subtended by contacts 21, 22 and 23 and by contacts 21a and 23a can be varied to produce the desired combination of duration of traverse, interval between traverses and additional duration of the final light crest in the traverse.

By comparison with Fig. 7 it is apparent that the Fig. 18 embodiment produces substantially the same result with a smaller direction switch. In case the longer duration of the final light crest in the traverse is not desired, timer contacts 21a and 23a, wires 121—a and 123—a and switch contacts 64 and 70 can be omitted.

An alternative method of reversing the timer motor is by the use of double-wound motor field coils connected in opposition and by energizing one or the other coil. The motor connections for this construction are illustrated in Fig. 19. Numeral 32 designates the field winding which, when energized by wire 126, rotates the timer motor in "right" direction and numeral 32—a designates the field which, when energized by wire 127, rotates the timer motor in "left" direction. Wire 126 is connected to contacts 61 and 62 of direction switch 213 (Fig. 18) and wire 127 is connected to contact 73 of said direction switch. Also contacts 52, 55, 63, 71 and 72 thereof are unutilized and may be omitted (the two space intervals 60 between contacts 70 and 71 and between 63 and 64 also can be omitted), thus permitting the direction switch to become one with sixteen space intervals instead of the twenty-one of Fig. 18 or the twenty-six of Fig. 7.

When direction switch 213 is in neutral position, the closing of brake switch 201 energizes timer motor 30 through switch contacts 92, 51 and 61, wire 126, field winding 32, wire 128 and armature 31, and the motor rotates in "right" direction. When direction switch is operated to left position, timer motor is energized through switch contacts 91, 51 and 73, wire 127, field winding 32—a, wire 128 and armature 31, and the motor rotates in "left" direction. When direction switch is operated to right position, timer motor is energized through switch contacts 93, 51 and 62, wire 126, field winding 32, wire 128 and armature 31, and the motor rotates in "right" direction. It is apparent that the same signal effects are produced by the modification of Fig. 19 as by the Fig. 18 embodiment.

Obviously the reversing timer motor modifications of Figs. 18 and 19 are applicable to other embodiments of my invention than illustrated in Fig. 7.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In a direction signal, a compartment containing a plurality of signal lights, means for coalescing the light fluxes therefrom, comprising means common to all the lights presenting the fluxes to an observer as a flux from but a single source, means for energizing at least one of said signal lights constantly and means for energizing the remainder of the lights therein changeably whereby said common means presents a changing unitary light effect to said observer.

2. A signal comprising a plurality of signal lights contained in a single compartment, means for coalescing the light fluxes from all the said signal lights comprising means common to all the signal lights presenting the fluxes therefrom to an observer as a flux from but a single source, means for constantly energizing at least one of said signal lights and means for energizing the remainder of the lights therein intermittently, the constantly energized light exhibiting one signal to said observer and the other lights exhibiting another signal to said observer.

3. A direction signal system comprising a plurality of signal lights, means for sequentially energizing said lights repeatedly in a given sequence, means for reversing the repeatable sequences of energization, said means for sequentially energizing including means whereby the last light in a repeatable sequence is energized for a greater period than any others in said sequence.

4. A direction signal system comprising a plurality of signal lights, means for sequentially energizing said lights repeatedly in a given sequence, means for reversing the repeatable sequences of energization, said means for sequentially energizing including means whereby a light in a sequence is energized for a greater period than the next preceding light in said sequence, said reversing means effecting said sequential relationship, regardless of whether the sequence be in one direction or the other.

5. A signal comprising a plurality of compartments, each having pairs of signal lamps therein, a circuit including said lamps, a timer in said circuit having segments for respectively and serially energizing certain lamps of the pairs, a brake switch in said circuit for continuously energizing another lamp of one of the pairs, a direction switch in said circuit adapted to energize the other lamps of all of the pairs including the one energized through the brake switch, said direction switch having three positions, and means under the control of the brake switch whereby in one position current from at least one segment of the timer is delivered to only the signalling lamp in one compartment, the other signalling lamp of which is controlled by the brake switch, the other positions of the direction switch transmitting energy constantly to all the constant signalling lamps of the compartments and sequentially to the other signalling lamps in one sequence or another, depending upon the predetermined positioning of said direction switch.

6. A direction signal comprising a plurality of signal compartments arranged in a row, a plurality of light sources in each compartment, means for energizing to a constantly visible degree, one set of light sources having members in respective compartments and simultaneously sequentially energizing the other light sources in the respective compartments, from compartment to compartment in order to provide a signal effect to an observer.

7. A vehicle signal comprising a plurality of compartments, a lamp respectively in each compartment, other lamps respectively therein, means connecting the light-emitting conducting paths of the two lamps in a given compartment in series, one of the lamps in each compartment having a substantially lower current characteristic for full brilliance than the other whereby it lights substantially to full brilliance and the other does not when full voltage is applied to the lamps in series, and means for periodically short-circuiting the light-emitting conducting path of the low-current lamp whereby the large lamp receives current to burn at its full brilliancy and the small one is substantially darker.

8. A signalling system comprising a compartment having a plurality of electric signal lamps therein, an energy source, means connecting said signalling lamps in series across said source at least part of the time, a plurality of switches connected between said source and said signalling lamps, a resistance in series with one of said switches, a distributor, means for operating the distributor, said second-named switch transmitting energy both to operate the distributor and the operating means and to supply current to the distributor, said distributor being wired between said second-named switch and one of said signal lamps to alternately short-circuit the latter, whereby energy is normally delivered to the signalling lamps in series but in certain positions of the distributor only through one of them, the other lamps being short-circuited.

9. In a direction signalling system, a plurality of signal lights, means for sequentially energizing the lights repeatedly and exclusively in a given sequence in either one of two different directions of lighting traversals, the intervals between repeating sequential traverses being at least of the order of the time interval comprising the events of a traverse.

10. A signalling system for vehicles comprising a plurality of lamps, having a brake switch responsive to a vehicle brake pedal movement, means for causing energization of at least one of said lamps when said brake switch is moved in response to brake pedal movement, a direction switch having neutral, left and right positions and means whereby all of said lamps are sequentially variably illuminated to provide a traversing light effect, according to the left or right setting of said direction switch.

11. In direction signalling apparatus for vehicles comprising at least three lamps arranged in a row at a point on the vehicle where they may be observed by persons outside of the vehicle, a battery, a timer, a direction switch, a plurality of contacts in the timer corresponding to the plurality of lamps, a distributing arm, means for moving the distributing arm, a brake switch responsive to movement of a brake pedal on the vehicle, means connecting said battery, brake switch and timer whereby when the brake switch is closed or said direction switch is in left or right position, said timer is driven to distribute current toward the respective lamps in order, said direction switch being formed so that when set to a neutral position it has the effect of limiting current distribution to only one of said lamps, and being formed so that in alternate left and right positions it has the effect of limiting current distribution to said lamps serially in opposite directions corresponding to said left and right positions.

12. A signal system for vehicles comprising a circuit, a source of energy therefor, a plurality of adjacent signal lights, a timer having connecting means therein adapted to distribute electrical energy to said signal lights by traverses of the signals, a direction switch, means for alternatively energizing the lights by energy received through said timer by predetermined alternate positioning of the direction switch, means whereby energization of the direction switch effects energization of the timer, the connecting means in the timer being spaced in such manner that the intervals between traverses are of at least the order of the duration of a traverse.

13. A signal system for vehicles comprising a circuit, a source of energy therefor, a plurality of adjacent signal lights, a timer having connecting means therein adapted to distribute electrical energy to said signal lights by traverses of the signal lights, a direction switch, means for alternatively energizing the lights by energy received through said timer by predeterminate alternate positioning of the direction switch, means whereby energization of the direction switch effects energization of the timer, the connecting means in the timer being spaced in such manner that the intervals between traverses are of the order of the duration of a traverse, and the duration of signal intensity variation in the last of the signals in a sequence is greater than in the others.

14. Signalling apparatus comprising a plurality of compartments, signal lights in the compartments, an electrical energy source, a timer for distributing energy from said source to lights in the compartments, means actuating said timer, a directional switch having a neutral position in which said circuit effects constant energization of one of said signal means in at least one compartment, said directional switch in alternate positions effecting by way of said timer serial energization of said signalling lights in said plurality of compartments.

15. Signalling apparatus comprising a plurality of compartments, pairs of fixed-intensity and intermittent lights in the respective compartments, a source of electric energy, a circuit, a timer adapted to distribute energy from the source through said circuit to the intermittent lights, a directional switch having a neutral position in which said circuit carries energy from said timer to one intermittent light in one compartment, said switch in alternate positions effecting by way of said circuit serial energizations of corresponding intermittent lights in said compartments, the fixed-intensity light in said one compartment being energized continuously, said directional switch also transmitting energy to the fixed-intensity lights in said other compartments when in either of said alternate positions.

16. A signal system for vehicles comprising a plurality of electric lamps, a power-supplying circuit including said lamps, a brake switch in said circuit which closes when the brake pedal of the vehicle is operated, a timer in said circuit having contacts connected to deliver energy sequentially to said lamps, one of said contacts being characterized in that it delivers energy to the last of the sequence of lamps for a longer interval of time than the intervals during which the other lamps receive energy, a motor in said circuit driving said timer, and a direction switch in said circuit having a plurality of operating positions, said circuit including connections such that either said closure of the brake switch or the movement of said direction switch to either of two of its positions results in energization of the motor and at least one of the lamps through said timer, said timer also being formed to provide an interval of time between successive energizations of the entire sequence of lamps of the same order of magnitude as the time interval required for a single energization of the entire sequence of lamps.

17. In a signalling system, a row of electric lamps, a circuit for supplying energy to said lamps, and distributing means in said circuit for directing energy for predetermined periods of time to each of the lamps in the row in a predetermined sequence of adjacent lamps from end to end of the row, said distributing means including means providing for an interval of time when no lamp is energized through said distributing means, said interval following the energization of the last lamp in the row and being at least approximately as long as the time required for the energization of the entire sequence of lamps in the row, the illumination of successive lamps thereby providing a signal of directional import to an observer.

18. In a signalling system, a row of electric lamps, a circuit for supplying energy to said lamps, and distributing means in said circuit for directing energy for predetermined periods of time to each of the lamps in the row in a predetermined sequence of adjacent lamps from end to end of the row, said distributing means including means providing for an interval of time when no lamp is energized through said distributing means, said interval following the energization of the last lamp in the row and being at least approximately as long as the time required for the energization of the entire sequence of lamps in the row, the illumination of successive lamps thereby providing a signal of directional import to an observer, said distributing means likewise including means providing for a longer energization of the last lamp in the sequence than for any other lamp in the sequence, thereby to emphasize the aforesaid directional effect.

19. In a signalling system, a row of electric lamps, a circuit for supplying energy to said lamps, and distributing means in said circuit for directing energy for predetermined periods of time to each of the lamps in the row in a predetermined sequence of adjacent lamps from end to end of the row, said distributing means including means providing for an interval of time when no lamp is energized through said distributing means, said interval following the energization of the last lamp in the row and being at least approximately as long as the time required for the energization of the entire sequence of lamps in the row, the illumination of successive lamps thereby providing a signal of directional import to an observer, said distributing means likewise including means providing for a longer energization of the last lamp in the sequence than for any other lamp in the sequence, thereby to emphasize the aforesaid directional effect, said distributing means being constructed and operated in such manner that the intervals of energization of successive lamps in the sequence overlap to a limited extent, excepting the interval between the energization of the last lamp in a sequence and the energization of the first lamp in a repeated sequence.

PHILIP H. CHASE.